United States Patent
Agah et al.

(10) Patent No.: US 10,852,278 B2
(45) Date of Patent: Dec. 1, 2020

(54) FUNCTIONALIZED METAL OXIDES AS A STATIONARY PHASE AND A SURFACE TEMPLATE FOR MICRO GAS CHROMATOGRAPHY SEPARATION COLUMNS

(71) Applicants: Masoud Agah, Blacksburg, VA (US); Muhammad Akbar, Blacksburg, VA (US); Apoorva Garg, Blacksburg, VA (US); Leyla Nazhandali, Blacksburg, VA (US); Hamza Shakeel, Blacksburg, VA (US)

(72) Inventors: Masoud Agah, Blacksburg, VA (US); Muhammad Akbar, Blacksburg, VA (US); Apoorva Garg, Blacksburg, VA (US); Leyla Nazhandali, Blacksburg, VA (US); Hamza Shakeel, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 181 days.

(21) Appl. No.: 16/054,949

(22) Filed: Aug. 3, 2018

(65) Prior Publication Data

US 2019/0070587 A1    Mar. 7, 2019

Related U.S. Application Data

(63) Continuation of application No. 14/738,509, filed on Jun. 12, 2015, now abandoned.

(60) Provisional application No. 62/011,612, filed on Jun. 13, 2014, provisional application No. 62/069,344, filed on Oct. 28, 2014, provisional application No. 62/114,137, filed on Feb. 10, 2015.

(51) Int. Cl.
| | | |
|---|---|---|
| G01N 30/60 | (2006.01) | |
| B01J 20/22 | (2006.01) | |
| B01J 20/281 | (2006.01) | |
| B01J 20/32 | (2006.01) | |

(52) U.S. Cl.
CPC ........ *G01N 30/6052* (2013.01); *B01J 20/223* (2013.01); *B01J 20/281* (2013.01); *B01J 20/3291* (2013.01); *B01J 2220/86* (2013.01)

(58) Field of Classification Search
CPC combination set(s) only.
See application file for complete search history.

(56) References Cited

U.S. PATENT DOCUMENTS

| | | | |
|---|---|---|---|
| 4,648,975 A * | 3/1987 | Barkatt | B01J 20/283 210/198.2 |
| 5,595,709 A | 1/1997 | Klemp | |
| 5,851,840 A | 12/1998 | Sluka et al. | |
| 2004/0215030 A1 | 10/2004 | Norman | |
| 2005/0230298 A1 | 10/2005 | Jiang | |

(Continued)

*Primary Examiner* — Nathaniel J Kolb
(74) *Attorney, Agent, or Firm* — Keith A. Vogt; Keith Vogt, Ltd.

(57) ABSTRACT

The present invention provides a detector and method for detecting substances in complex mixtures. The detector includes a microfabricated preconcentrator, a separation column with an on-chip thermal conductivity detector, a controller for controlling flow and thermal management and a user interface. The thermal conductivity detector includes a first resistor located at an inlet of the separation column and a second resistor located at an outlet of the separation column.

17 Claims, 12 Drawing Sheets

Extraction Phase

Back Side View

Analysis Phase

(56) References Cited

U.S. PATENT DOCUMENTS

| | | | |
|---|---|---|---|
| 2009/0043042 A1 | 2/2009 | Lippa | |
| 2010/0076103 A1 | 3/2010 | Wyndham | |
| 2010/0093098 A1* | 4/2010 | Ball | B01J 19/0093 |
| | | | 436/50 |
| 2011/0089096 A1* | 4/2011 | Linford | B01J 20/28007 |
| | | | 210/198.3 |
| 2012/0077260 A1* | 3/2012 | Sharon | G01N 35/1097 |
| | | | 435/287.2 |
| 2012/0273350 A1 | 11/2012 | Piechotta | |
| 2013/0199264 A1 | 8/2013 | Seike | |
| 2015/0130473 A1 | 5/2015 | Agah et al. | |
| 2016/0103104 A1 | 4/2016 | Gianchandani | |
| 2017/0045495 A1* | 2/2017 | Trowell | G01N 33/5082 |

\* cited by examiner

FUNCTIONALIZED METAL OXIDES AS A STATIONARY PHASE AND A SURFACE TEMPLATE FOR MICRO GAS CHROMATOGRAPHY SEPARATION COLUMNS

RELATED APPLICATIONS

This application claims the benefit of U.S. Provisional Application Nos. 62/011,612 filed Jun. 13, 2014, 62/069,344 filed Oct. 28, 2014, and 62/114,137 filed Feb. 10, 2015 herein incorporated by reference.

STATEMENT REGARDING FEDERALLY SPONSORED RESEARCH & DEVELOPMENT

This invention was made with government support under 1) contract number ECCS1002279 awarded by the National Science Foundation of the United States 2) by the National Science Foundation (NSF) under CAREER Award no. ECCS-0747600 and NIOSH Grant 5R210H010330 and 3) under contract number 1R210H010330 awarded by the National Institutes of Health of the United States. The government has certain rights in the invention.

INCORPORATION BY REFERENCE OF MATERIAL SUBMITTED ON A COMPACT DISC

Not applicable.

BACKGROUND OF THE INVENTION

Gas chromatography (GC) is a reliable chemical analysis technique that is used to separate and identify the constituents of complex gas mixtures. GC has applications in a vast range of areas such as environment monitoring, food processing, pharmaceutical industry, biomedical science, forensic and trace analysis. Traditional bench-top GC instruments, though widely used, are bulky and expensive as well as time and energy intensive. The progressive innovations in microfabrication techniques coupled with nanotechnology have prompted a renewed interest in miniaturizing key GC components over the last decade. The development of new stationary phase coating techniques has been a continuous research area and the heart of micro gas chromatography (μGC) column performance. Apart from the application of most common polymer based gas-liquid stationary phases for μGC separation columns, there has also been research effort toward the development of MEMS-compatible methods for the integration of solid-adsorbent materials (monolayer-protected gold, carbon nanotubes, silica nanoparticles, gold nanoparticles, silica and graphite) into μGC columns. Although these adsorbent/gas-solid stationary phases have shown attractive features for the separation of complex mixtures, the application of these coating schemes for very narrow-width (<20 μm) and deep (>150 μm) rectangular microchannels has not been straightforward as summarized in Table 1:

TABLE 1

Summary of microfabricated GC columns with gas-solid stationary phases

| Authors | Column Geometry | Phase-Deposition Method | Limitations |
|---|---|---|---|
| Reston [41] (1994) | Rectangular (30 μm deep, 100 μm wide, 0.9 m-long) | Evaporation of copper phthaocyanine film | Applicable to only shallow channel depth. |
| Stadermann [17] (2006) | Rectangular (100 μm deep, 100 μm wide, 50 cm-long) | Chemical vapor deposition of carbon nanotubes | Incomplete coverage of the channel and high process temperature. |
| Zareian-Jahromi [18] (2010) and Shakeel [27] (2013) | Rectangular (250 μm deep, 25 μm wide, 25 cm-long) Multicapillary (25 μm wide, 200 μm deep, 25 cm-long) | Self-assembly of thiol on electroplated gold surface | Extensive charaterization, high-process temperature and chip-level processing. |
| J. Vial [22] (2011) | Rectangular and semipacked (100-125 μm deep, 50-150 μm wide, 1 m-long). | Wafer-level Sputtered silica film deposition | High stationary phase film thickness variations and applicable to low-channel depth. |
| Wang and Shakeel [21] (2013) | Rectangular (250 μm deep, 150 μm wide, 1 m-long), Multicapillary (200 μm deep, 20 μm wide, 25 cm-long). | Silica nanoparticles Using layer-by-layer technique. | High-process temperature and chip-level processing. |

The current adsorbent based coating schemes for these particular column designs suffer from factors such as low-yield, chip-level coating, high processing temperatures and require elaborate experimentation. Moreover, these methods present a major hindrance towards the monolithic integration of different μGC components on a single chip. This warrants the need for developing wafer-level facile complimentary metal-oxide-semiconductor (CMOS) compatible coating techniques that produce mechanically and thermally stable, chemically inert and selective stationary phases.

Atomic layer deposition ("ALD") has emerged as a tool for the growth of low-temperature thin-films on a variety of substrates for myriad applications, generally as a gate oxide in CMOS technology. ALD enables conformal and homogeneous coatings of flat, very high-aspect-ratio (HAR) microchannels and even nanostructure surfaces with precision within a few angstroms. The use of ALD coatings for separation science has been very recently reported for ultra-thin-layer chromatography where the enhancement of separation capabilities of silica support media using different ALD coatings was demonstrated. The use of ALD-based films as a stand alone separation media for µGC has not been reported.

Other applications for µGC include the detection of volatile organic compounds (VOCs) that are emitted by a wide variety of products including solids and liquids. Prolonged exposure to VOCs can cause serious health effects including liver, kidney, and nervous system diseases and can even cause cancer. Similar effects have been reported for various aquatic organisms. Different analytical techniques for their detection have been reported in the literature. Microscale gas chromatography provides a solution with reduced size, low power consumption, and the capability for handheld analysis of complex VOCs.

µGCs have not been used in the detection of VOCs in aqueous matrices due to incompatibility of the systems with aqueous matrices. Water saturates the adsorbent in the micro-thermal preconcentrator (µTPC) by capturing available adsorption sites and also damages most common polymer based stationary phases resulting in changes in the retention time, selectivity and column bleeding. Most widely used flame ionization detectors (FID) are extinguished by water and a decrease in the sensitivity of electron capture detectors (ECDs) has also been reported. The United States Environmental Protection Agency (EPA) has specified a list of water organic compounds (WOCs) with their maximum contamination level (MCL). At levels above the specified MCL (usually in ppb), the presence of WOCs in aqueous media poses serious threat to human and aquatic life as shown in Table 2.

In addition, gas chromatography (GC) has been the established method for assessing the presence and concentration of VOCs in the environment, and GC coupled to mass spectrometry (GC-MS) is one of the most accurate and widely used tools. In this technique, samples are first collected from the field through trap based systems such as sorbent tubes or canisters and then are analyzed in a laboratory by trained technicians. This technique requires manual intervention and multiple steps including sampling, storage, and shipping before analysis, and therefore is susceptible to higher losses and has longer measurement cycles. Most of these drawbacks can be overcome by using portable, field-deployable, and real-time detection systems. There have been attempts at miniaturizing GC-MS systems, but such systems are still bulky, expensive, and consume high amounts of power. Other real-time detection techniques involve using a sensitive photo-ionization detector (PD) to realize a total VOC analyzer. PD-based systems suffer from selectivity issues and require filtering at the source, which renders them ineffective and expensive for multi-compound analysis. Colorimetric tubes are another inexpensive and popular technique for VOC analysis, which rely on a color change, induced by the irreversible reaction between the sensing material and the analyte. However, this technique requires human intervention, and its use is limited by slow response and large uncertainty. Several commercial high performance portable gas chromatography systems have been reported, but they are still bulky, energy inefficient, and expensive for real-time environmental monitoring applications.

BRIEF SUMMARY OF THE INVENTION

In one embodiment, the present invention provides an approach for utilizing atomic layer deposited alumina as a

TABLE 2

List of water organic compounds with their originating sources and potential health risks.

| Contaminants | Potential health effect | Contamination sources | Amount recovered (ng) | Recovery | log($K_{ow}$) | MCL |
|---|---|---|---|---|---|---|
| Toluene | Nervous system, liver problems | Petroleum factories | 5.7 | 23% | 2.75 | 1 mg $l^{-1}$ |
| PCE | Liver problems; increased risk of cancer | Discharge from factories and dry cleaners | 5.4 | 18% | 2.57 | 5 µg $l^{-1}$ |
| Chlorobenzene | Liver and kidney problems | Discharge from chemical and agricultural chemical factories | 9 | 25% | 2.86 | 0.1 mg $l^{-1}$ |
| Ethylbenzene | Liver and kidney problems | Petroleum refineries | 18.7 | 38% | 3.14 | 0.7 mg $l^{-1}$ |

The current methods for the identification of WOCs rely on removing them from the aqueous sample prior to analysis using a bench-top GC system. These methods include solid-phase micro-extraction (SPME), purge and trap, and hollow fiber membranes. They cannot be used for on-site monitoring of the aqueous sample and rely on transporting samples to laboratories. Currently, commercially available FROG-4000™ from Defiant Technologies and Water Analysis Surety Prototype (WASP) from Sandia National Laboratories are capable of performing field analysis of water contamination. Nevertheless, the systems are large, expensive, require a trained technician and rely on conventional purge and trap mechanisms. Thus, there still remains a demand for the development of a light weight, less power hungry, inexpensive independent system capable of extracting and detecting WOCs from aqueous media.

gas-solid stationary phase medium for microfabricated gas chromatography columns. After atomic layer deposition (ALD) of aluminum oxide, a chloroalkylsilane is utilized to functionalize the oxide surface to improve peak symmetry and retention times. Semipacked columns (1 m-long, 190 µm-wide, 180 µm-deep with 20 µm-embedded circular micropillars) were utilized.

In yet other embodiments, the present invention uses the detector disclosed in co-pending U. S. Patent Application Publication No. US20150130473A1, the disclosure of which is incorporated herein by reference in its entirety. In other embodiments, the present invention combines the micro components disclosed below with this detector in tandem or combines the components on a single chip.

In other embodiments, the present invention uses ALD with self-limiting gas phase chemical reactions for deposition, making it suitable for micromachined columns having very high-aspect ratios. The use of ALD for stationary phase coating ensures good selectivity, separations and retention of different compounds. The inherent properties of atomic layer deposition provide an easy route to practically coat any microfabricated column architecture. The metal oxide thin film provides surface properties that can improve the binding of polymer-based stationary phases and thus can act as a template for deposition of these polymeric phases. Moreover, the techniques of the present invention also provide innovative wafer-level coating approaches that are compatible with standard CMOS and MEMS processes.

In other embodiments, ALD treated/silane functionalized columns are used to efficiently separate a multicomponent sample mixture and yielded 4200 plates per meter. The ALD based stationary phase is found to be stable after multiple injections and at high operating temperatures.

In another embodiment, the present invention provides a method that facilitates a simple and wafer level coating scheme that provides a highly controllable film thickness. The inherent properties of atomic layer deposition provide an easy route to coat very challenging microfabricated column designs.

In yet other embodiments, the present invention provides a wafer-level application that utilizes a silane functionalized aluminum oxide thin-film as a stationary phase medium. ALD uses self-limiting gas phase chemical reactions for deposition, thus affording an alumina film with very high step-coverage of semipacked columns having aspect-ratios (depth:width) of 10:1. The coating techniques of the present invention may also be used with µGC columns with very narrow channel widths (5 µm or less).

In another aspect, the present invention concerns a µGC architecture, based on a monolithically integrated microfabricated separation column and thermal conductivity detector (TCD). The architecture performs very sharp injections from the micro-preconcentrator, which is compatible with flow sensitive gas detectors like TCD. The embodiment has environmental monitoring applications as well as applications for water monitoring, homeland security, and food analysis.

In other embodiments, the present invention provides a micro-purge extractor (µPE) chip and integrates with a micro-scale gas chromatography (µGC) system for the extraction and analysis of water organic compounds (WOCs) from aqueous samples. The 2×3 cm µPC chip contains inlet and outlet ports and a sealed cavity. An aqueous sample is introduced from the top inlet port while a pure inert gas is supplied from the side inlet to purge WOCs from the µPE chip. The outlets are assigned for draining water from the chip and for directing purged WOCs to the micro-thermal preconcentrator (µTPC). The trapped compounds are desorbed from the µTPC by resistive heating using the on-chip heater and temperature sensor, are separated by a 2 m long, 80 mm wide, and 250 mm deep polydimethylsiloxane (OV-1) coated µGC separation column, and are identified using a micro-thermal conductivity detector (µTCD) monolithically integrated with the column.

In certain embodiments, the present invention is capable of providing rapid chromatographic separation (<1.5 min) for quaternary WOCs namely toluene, tetrachloroethylene (PCE), chlorobenzene and ethylbenzene with a minimum detection concentration of 500 parts-per-billion (ppb) in aqueous samples.

In further embodiments, the present invention provides a ready-to-deploy implementation of a microfabricated gas chromatography (GIGC) system characterized for detecting Hazardous Air Pollutants (HAPs) at parts-per-billion (ppb) concentrations in complex mixtures. In one embodiment, the device includes a microfabricated preconcentrator (µPC), MEMS separation column with on-chip thermal conductivity detector (µSC-TCD), flow controller unit, and all necessary flow and thermal management as well as user interface circuitry to realize a fully functional µGC system. The µPC and µSC-TCD may be used to target analytes such as benzene, toluene, tetrachloroethylene, chlorobenzene, ethylbenzene, and p-xylene. A Limit of Detection (LOD) of −1 ng was achieved, which corresponds to a sampling time of 10 min at a flow rate of 1 mL/min for an analyte present at −25 ppbv.

In other embodiments, the present invention concerns a method of using flow-manipulation generated by sharp injection plugs from the µPC even in the presence of a flow-sensitive detector like a µTCD.

In other embodiments, the present invention concerns a µGC architecture, which leverages monolithic integration of a separation column with micro-thermal conductivity detectors (µSC-TCD) to minimize band broadening and chip-to-chip fluidic interfaces. The integration eliminates the need for a reference line and requires fewer external components. Another innovative aspect of the architecture is a method to perform very sharp injections from the µPC even in the presence of flow-sensitive gas detectors like TCD. The design relaxes constraints on the design of the µPCs by mitigating the effect of vapor desorption rate on the injection-plug width. The design achieves low detection limits suitable for environmental monitoring applications.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
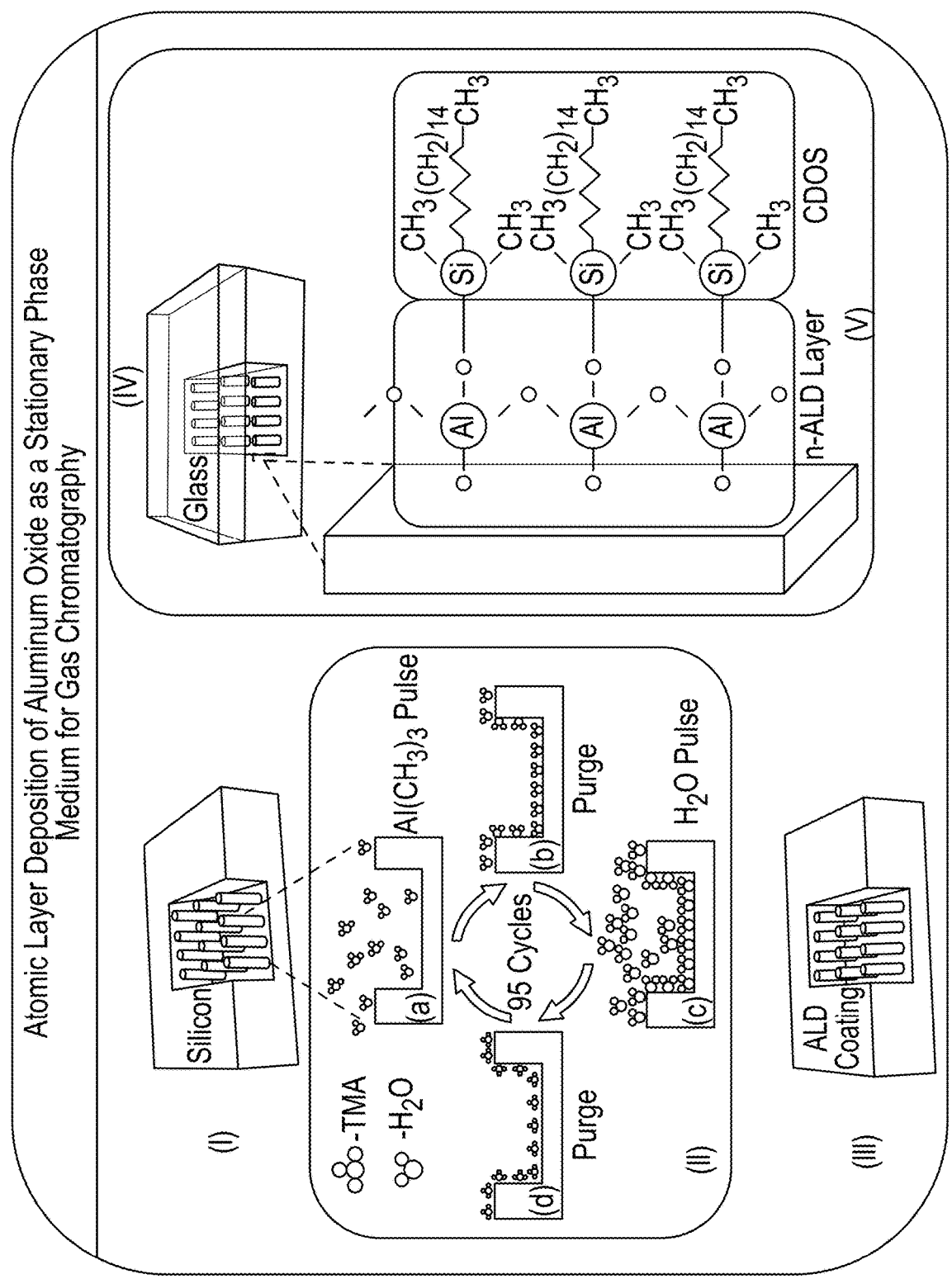
FIG. 1: Schematic representation of ALD-based stationary phase coating for an embodiment of the present invention. (I) anisotropically etched semipacked column, (II) and (III) atomic layer deposition of 10 nm alumina film and (II) 95 cycles with each cycle having four steps (a) TMA exposure (b) purge (c) $H_2O$ exposure (d) purge, (IV) anodic bonding of ALD-coated wafer with glass substrate, (V) silane deactivation for 24 hours.

As shown in FIG. 1, in one preferred embodiment, the present invention provides a method for fabricating semi-packed or packed columns that may be about 1 m-long, 190 µm wide with 180 µm deep channels, with 20 µm integrated circular micropillars, with 40 µm post spacing. In other embodiments, the posts may have other cross-sectional geometries and be arranged in regular patterns and irregular patterns. In a preferred embodiment, the posts may be rectangular and be arranged in a zigzag pattern.

The process starts with a standard RCA cleaning of 4 inch, 500 µm thick n-type single side polished silicon wafers (University Wafers). After performing wafer priming using hexamethyldisilizane (HMDS), AZ9260 photoresist (AZ Electronic Materials) is spin coated at 2000 rpm to acquire an 8 µm thick resist layer. This is followed by soft-baking the resist-coated wafer at 110° C. for 1 minute. The wafer is then exposed for 50 seconds using a mask aligner (Karl Suss) to transfer features from a chrome mask on to the soft-baked resist-coated wafer. Following exposure, the features are developed in AZ400K developer (AZ Electronic Materials) and DI water (3:1). Afterwards, the developed wafer is hard-baked for 3 minutes at 110° C. SF6 and C4F8 are used to anisotropically etch the wafer (via a standard Bosch process) using an Alactel deep reactive ion etcher (DRIE).

Figure 2A:
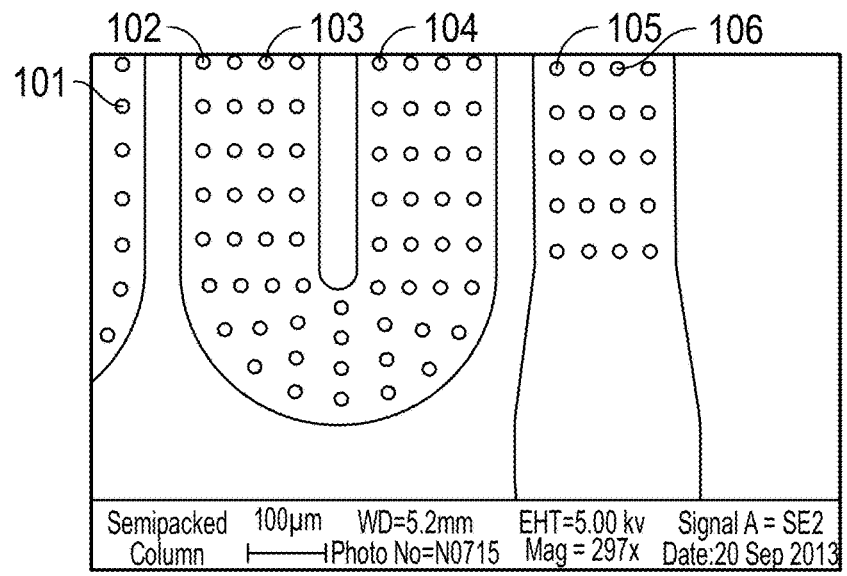
FIGS. 2A and 2B: Depict a 1 m-long semipacked column with integrated 20 µm circular microposts and post spacing of 40 µm for an embodiment of the present invention.
Figure 2B:
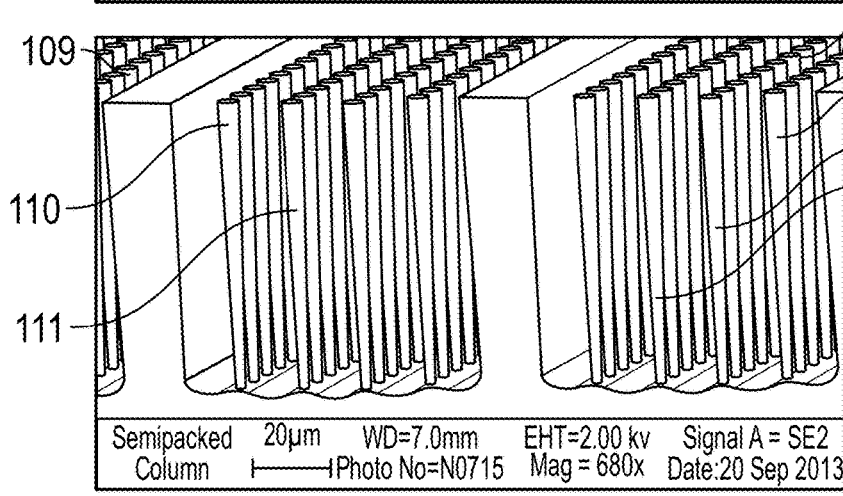

Following etching, the photoresist is first removed using acetone and the wafer is then placed in a piranha etch solution to remove any organic residue left during either the etching or photoresist removal steps (FIG. 1, step-I). Representations of a 1 m-long and 180 µm-deep microfluidic channel are shown in FIG. 2 after anisotropic etching and photoresist removal. As shown, one or more microposts 101-113 are created as described above.

The ALD coating process for aluminum oxide using trimethylaluminum (TMA) and water as precursors is well established. The successive reactions during aluminum oxide growth on the silicon surface from TMA and water is described by two sequential reactions as given below.

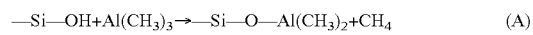

$$—Si—OH + Al(CH_3)_3 \rightarrow —Si—O—Al(CH_3)_2 + CH_4 \qquad (A)$$

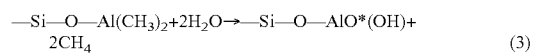

$$—Si—O—Al(CH_3)_2 + 2H_2O \rightarrow —Si—O—AlO*(OH) + 2CH_4 \qquad (3)$$

The asterisk in reaction (B) represents an oxygen shared between adjacent aluminum atoms on the surface. During the first reaction (A), the surface silicon hydroxyl species react with TMA forming a dimethyl-terminated aluminum species and methane as a byproduct. The excess TMA will not react further with the surface, resulting in a self-limiting process. In the second reaction (B), two water molecules react with the dimethyl-terminated aluminum species, forming an oxide bridge between adjacent aluminum species and a terminal hydroxide on each aluminum atom as well. The terminal hydroxide then allows for the production of additional aluminum oxide monolayers by the same two step cycles.

Thin alumina film deposition on the etched silicon wafer was performed at 250° C. using a thermal ALD Cambridge NanoTech system (Savannah S100). TMA (Sigma-Aldrich) and water precursors (deionized water used from clean room) were used to deposit a 10 nm aluminum oxide film. Each ALD deposition cycle consists of a 15 ms sequential precursor gas exposure of either TMA or $H_2O$ (20 sccm flow) followed by a 4 second purge (FIG. 1, step-II) to provide a film thickness of 1.07 Å per cycle. The wafer was coated for approximately 16 minutes (95 cycles) to get the desired film thickness of 10 nm. The surface of the ALD-coated silicon was characterized using an atomic force microscope (Bruker Nanoscope V) with a silicon tip in a tapping mode. A 1 µm² area was scanned at a rate of 0.98 Hz and recorded using 512 scan lines. The 3-D surface plot of a 10 nm aluminum oxide film gave a root mean square roughness of 0.264 nm, clearly demonstrating that the aluminum oxide film generates a highly smooth and uniform surface.

The thin-film deposition rate of the ALD system may be improved further by employing a separated ALD process. It has been shown that growth rates as high as 1.2 nm/sec may be achieved for aluminum oxide thin films using this technique. Therefore, this modified ALD process could be integrated into MEMS fabrication of columns for high throughput stationary phase deposition.

After performing the ALD coating, the etched silicon wafer was anodically bonded with a 700 µm thick and 4 inch wide double side polished Borofloat wafer (Coresix Precision Glass) at 1250V and 400° C. for 45 minutes (FIG. 1, step-III). The wafer was then diced into individual devices for functionalization and chromatographic testing. In order to provide an interface between the GC injection port and detector, a 220 µm outer diameter by 100 µm internal diameter fused silica capillary tubing (Polymicro Technologies) was attached to the column inlet and outlet ports using Epoxy 907 (Miller Stephenson). The surface of the ALD oxide film and the glass cover was finally functionalized by filling each column with 10 mM chlorodimethyloctadecylsilane (CDOS, Sigma Aldrich), in toluene solution for 24 hours at room temperature (1, step-IV).

Before performing chromatographic tests, each device was first purged for 30 minutes with nitrogen. This was followed by column temperature conditioning in the GC oven for approximately one hour (35° C. ramped at 2° C./min to 150° C.) at a constant inlet pressure of 10 psi.

A bench top 7890 series Agilent GC system equipped with a flame ionization detector (FID), an electronic pressure controller and an autosampler (7359A) unit was used for injection and detection purposes. Both the injector and detector temperatures were maintained at 280° C. Ultrapure nitrogen (>99.99%) was purchased from Air Gas Ltd, USA and used as the carrier gas. Methane (99% grade, Matheson Trigas, Ohio) was used for calculating the gas velocities to generate Golay plots. All chromatographic test mixtures were prepared using standard HPLC grade chemicals (Sigma-Aldrich).

Ideally a chromatographic peak should be symmetrical, or Gaussian, in shape. Asymmetric peaks, usually in the form of peak tailing, influence the column performance. A tailing factor ($T_f$) can be used to quantify the peak tailing and is given by:

$$T_f = \frac{a+b}{2a}$$

where both a and b, measured at 5% of the peak height, represent the front and back half-widths respectively. A $T_f=1$ represents a perfectly symmetric peak (a=b), whereas peak tailing (a<b) will yield values of $T_f>1$.

Figure 3:
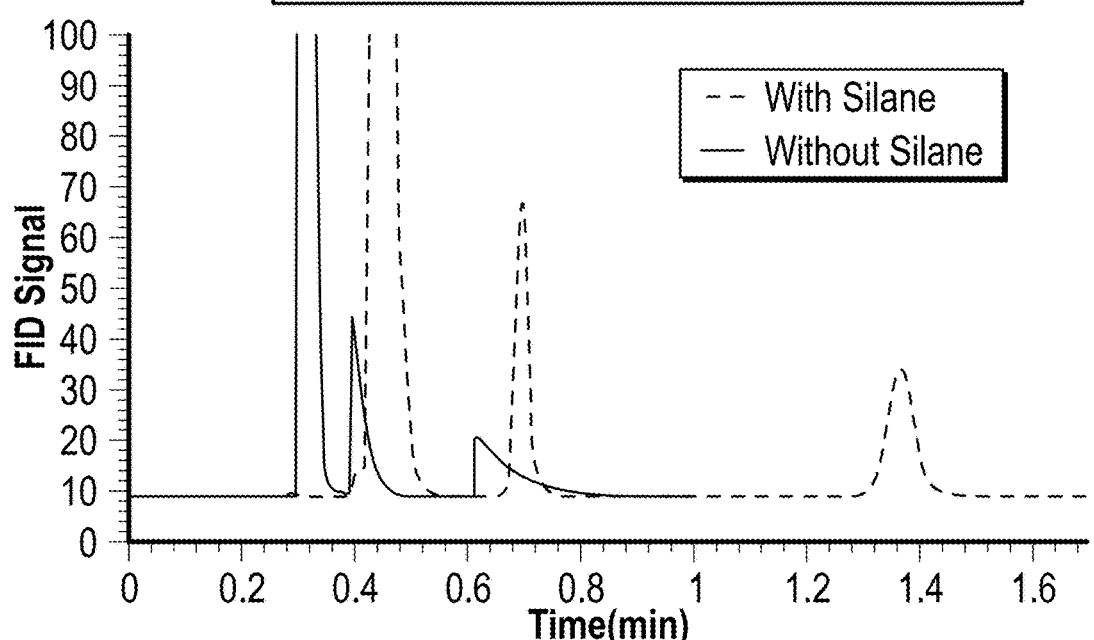
FIG. 3: Effect of silane functionalization on a ALD-coated semipacked column at 50° C., 250:1 split ratio, 0.1 µL injection volume and 10 psi column pressure (compound identification in the order of elution n-hexane (solvent), n-nonane and n-decane).

Alumina as an adsorbent material has been successfully used for conventional gas-solid chromatographic separations. Although the ALD-based alumina coating (without any alkylsilane based treatment) of one embodiment of the present invention clearly demonstrates separation capabilities, significant asymmetric peak shapes are observed as shown (FIG. 3) and tailing factors ($T_f$) of 5.95 and 7.15 were calculated for n-nonane and n-decane peaks (7000 ppm diluted in n-hexane) respectively. This may be the result of unknown changes in the alumina structure from the ALD process that affects the equilibration of the solutes with the stationary phase. FIG. 3 also shows the separation profile for the same hydrocarbon mix on the atomic layer deposited alumina column after silane functionalization. The chromatographic performance of the alumina adsorbent is significantly enhanced using alkylsilane functionalization performed after anodic bonding of the cover glass wafer (tailing factor of 1).

Organochloroalkylsilanes may also be used to functionalize the medium to enhance retention times and peak symmetry.

The primary performance criterion for GC columns is expressed by the number of theoretical plates (N) for a certain compound and is calculated from chromatogram using the following formula.

$$N = 5.54 * \left(\frac{t_r}{w_{1/2}}\right)^2$$

where $t_r$ is the retention time and $w_{1/2}$ is the peak width at half height. Another related parameter that takes into account the column length (L) for the comparison of different columns is the height-equivalent-to-a-theoretical-plate (HETP), where $$HETP = \frac{L}{N}$$

The ALD-coated/silane functionalized semipacked MEMS columns provided up to 4200 plates per meter using n-decane (diluted in dichloromethane) at 50° C. at an optimum inlet pressure of 7.5 psi (linear velocity of 8.15 cm/sec). Since a meter long microfabricated column coated with gas-solid stationary phases (sputtered silica or carbon nanotubes) typically yields around 4000-5000 plates/meter, accordingly, in one embodiment, the present invention provides a method for creating micro GC columns that is comparable to other non-conventional coatings.

Figure 4:
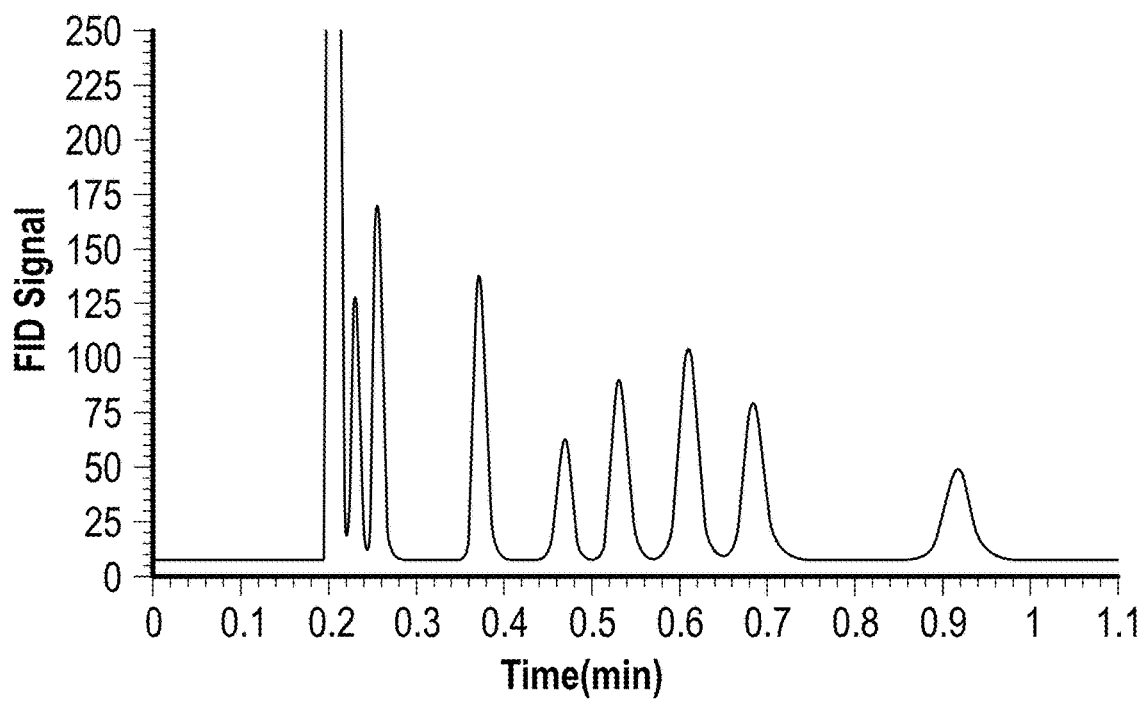
FIG. 4: Separation performance of an ALD-coated/silane functionalized semipacked MEMS column at 50° C., 7.5 psi inlet pressure with split ratio of 75:1. Compound identification in order of elution 1. dichloromethane (solvent) 2. n-hexane (k'=0.23) 3. benzene (k'=0.38) 4. toluene (k'=1.01) 5. Tetrachloroethylene (k'=1.55) 6. chlorobenzene (k'=1.90) 7. Ethylbenzene (k'=2.34) 8. p-xylene (k'=2.75) 9. n-nonane (k'=4.00).

The separation capability of the embodiment was tested using a mixture containing eight compounds: n-hexane, benzene, toluene, tetrachloroethylene, chlorobenzene, ethylbenzene, p-xylene and n-nonane diluted in dichloromethane to a concentration of 15000 ppm. An autosampler was used to inject 0.3 µL of the mixture with a split ratio of 75:1. The column pressure and oven temperature were maintained at 7.5 psi and 50° C. respectively. The resulting chromatographic separation (FIG. 4) provided good resolution and retention of the compounds, with the entire separation achieved in less than a minute at isothermal conditions. Capacity factors (k'), the ratio of the time spent in the stationary phase relative to the mobile phase, ranged from 0.23 for hexane to 4.0 for n-nonane, with the separation driven primarily by differences in boiling points as reflected by the order of elution.

In one application, the present invention may be used to separate mixtures with either straight chain alkanes or aromatic hydrocarbons. The functionalized alumina thin film of the present invention also shows similar separation capabilities as afforded by conventional alumina particles.

The long-term and thermal stability of the present invention was also evaluated. Chlorobenzene and n-nonane (diluted in dichloromethane) were utilized as probes with multiple injections made using an autosampler unit. The deviations in the plate numbers (N) and the capacity factors (k') of each compound were calculated from the $1^{st}$, $25^{th}$, $50^{th}$, and $75^{th}$ injections as presented in Table 3.

TABLE 3

Long-term stability of ALD based stationary phase with multiple injections (GC testing at 50° C., 7.5 psi)

| | Chlorobenzene | | n-Nonane | |
|---|---|---|---|---|
| Injection | Plate Number (N) | Capacity Factor (k') | Plate Number (N) | Capacity Factor (k') |
| $1_{st}$ | 3368 | 1.87 | 4380 | 3.77 |
| $25^{th}$ | 3508 | 1.85 | 4359 | 3.82 |
| $50^{th}$ | 3319 | 1.85 | 3962 | 3.89 |
| $75^{th}$ | 3886 | 1.85 | 3948 | 3.90 |
| % RSD | 7.3 | 0.64 | 5.7 | 1.6 |

These results demonstrate that after multiple injections the silane-functionalized alumina coating remains stable, with less than 8% deviation in plate numbers and less than 3% deviations in k' values. Similarly, using the same compounds, the thermal stability of the ALD based stationary phase was also evaluated. The column was subjected to thermal cycles of 100° C., 150° C. and 200° C. for 8 hours each under a constant inlet nitrogen pressure of 2.5 psi. After each thermal cycle, the column testing was carried out at 50° C. and 7.5 psi. The deviations in the N and k' values are shown in Table 4.

TABLE 4

Temperature stability test of ALD based stationary phase (GC testing at 50° C., 7.5 psi)

| Column | Chlorobenzene | | n-Nonane | |
|---|---|---|---|---|
| heating for 8 hours @ | Plate Number (N) | Capacity Factor (k') | Plate Number (N) | Capacity Factor (k') |
| Before Heating | 3990 | 1.80 | 4343 | 3.92 |
| 100° C. | 3930 | 1.82 | 4251 | 3.94 |
| 150° C. | 3808 | 1.80 | 4308 | 3.91 |
| 200° C. | 3128 | 1.65 | 4020 | 3.59 |
| % RSD | 10.7 | 4.3 | 3.4 | 4.3 |

The results show that the alumina based stationary phase remains stable up to 150° C. with small variations in retention times; however, there is some degeneration at 200° C., and column performance deteriorates considerably if heated beyond temperatures of 200° C.

The effect of variations in microfabrication processes on chromatographic efficiency was also considered. Three separation columns were fabricated on different wafers using identical fabrication techniques as discussed above. A 15% variation (RSD) was observed in the plate number values (using n-decane) for the tested columns. This high chip-to-chip variation could be attributed to variations in the end connections.

In yet other embodiments, the present invention concerns a device and method using atomic layer deposited alumina with alkylsilane functionalization for use in gas chromatographic separations. The use of ALD ensures highly conformal film deposition inside complex column designs and affords good selectivity, separations and retention of different compounds. Compared to very recently reported methods for μGC columns that utilize sputtering systems for alumina deposition, the present invention achieves very symmetric peaks and separations. Moreover, the present invention is not limited by the column depth; thus improving column flow rate and the sample capacity by increasing the cross-sectional area of the microfluidic channel. In yet other embodiments, the present invention, provides a method for tuning the selectivity of alumina films by using silanes with different functional groups. Since ALD is used for very thin film depositions, in range of 5-15 nm, there will not be a significant change in the separation performance.

Figure 5:
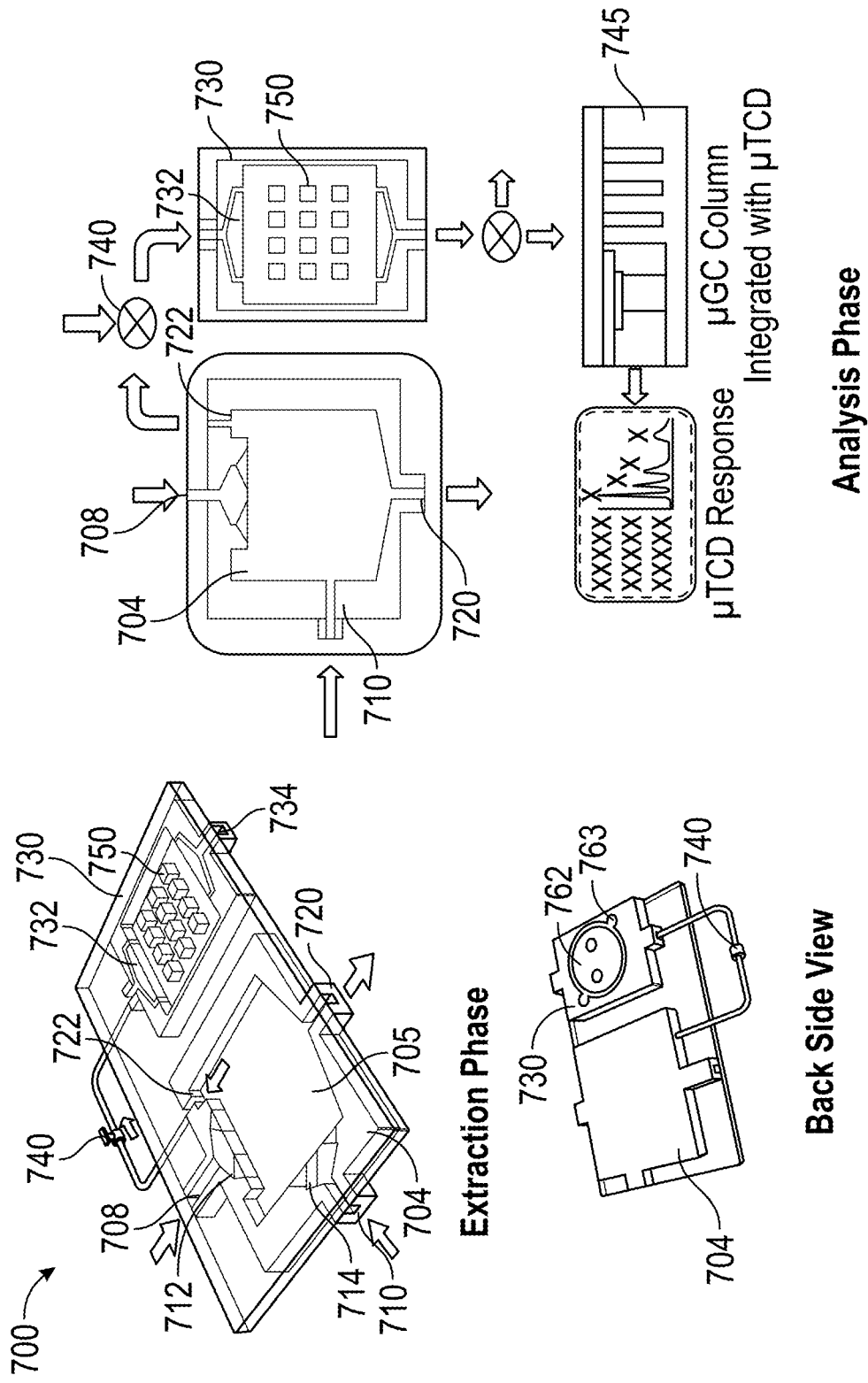
FIG. 5: Diagram of an embodiment of the present invention showing the topology for the extraction and analysis of water organic compounds. A back-side heater is utilized for thermal desorption of analytes from the µTPC for chromatographic analysis.
Figure 6C:
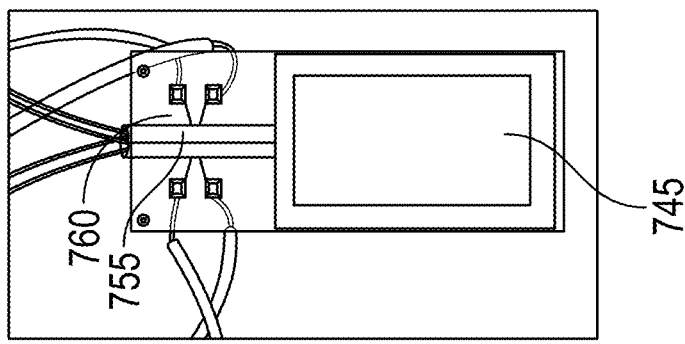
FIGS. 6A, 6B and 6C: An image of an embodiment of the present invention showing a detector fabricated (A) µPE, (B) µTPC and (C) µGC chip with embedded resistors utilized as the thermal conductivity detector for aqueous analysis.
Figure 6B:
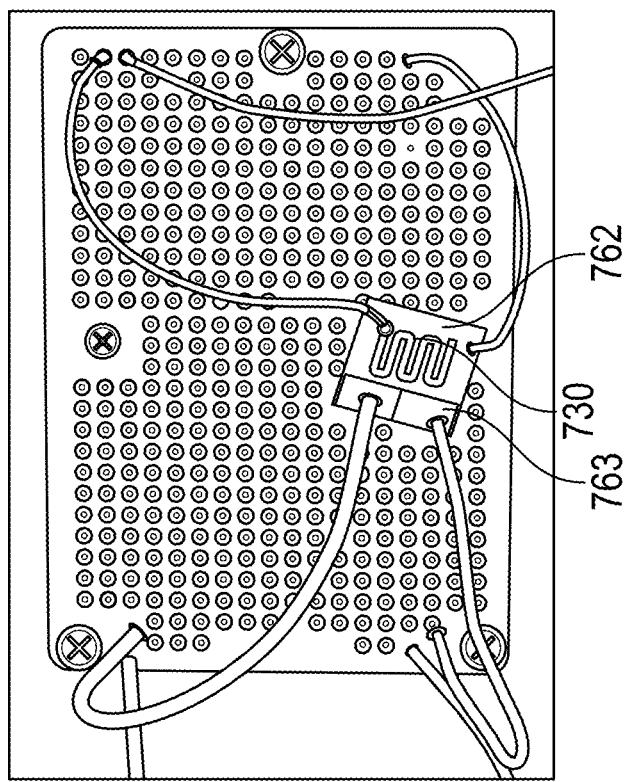
Figure 6A:
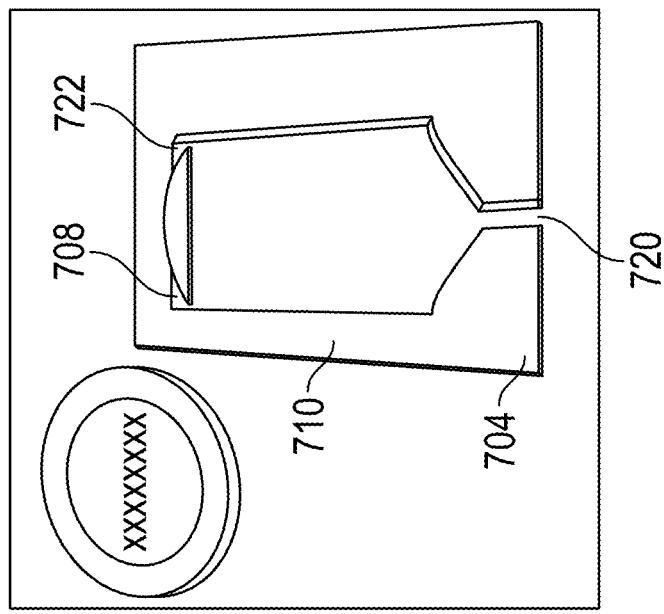

FIGS. 5 and 6 show a preferred embodiment of the present invention that includes detector 700 and a micro purge extractor ("μPE") 704 for extraction of WOCs from an aqueous sample. μPE 704 contains two spaced apart inlets, inlet 708 for the aqueous sample to be analyzed and inlet 710 for a pure inert gas to purge the WOCs from cavity 705.

Spacing the inlets apart promotes uniform distribution. In other embodiments, distribution network 712 may be provided to uniformly spread the sample inside the chip. Similarly, network 714 for the purging gas is used to enhance the interaction between two phases (air and water) inside the chip and to facilitate the removal of WOCs from the streaming water. Other networks may also be used to improve gas flow and distribution at other locations as well. The chip also contains two outlets. Outlet 720 is used for waste water and outlet 722 directs purged WOCs to trap μTPC 730 which may be distributed by network 732. Purge outlet 722 directs WOCs to μTPC 730. It may be located at the top corner of the μPE chip. Device 700 is operated in two phases namely; (1) the extraction phase and (2) the analysis phase.

During the extraction phase, two microfabricated chips (μPE 704 and μTPC 730) may be connected in a tandem, combined on a single chip or configured to use valve 740 while μPE chip 704 is maintained vertically to prevent water from entering into μTPC 730 chip 730 via the air or purging gas outlet 710. As shown, this locates outlet 722 above outlet 720, which permits water to drain from outlet 720 while preventing it from entering outlet 722.

With a source of analyte such as a vial connected to sample inlet 708, the aqueous solution is introduced into the μPE chip 704 using purified nitrogen. High purity nitrogen gas is supplied through the air inlet 710 of the μPE chip trapping WOCs on the adsorbent surface on μTPC chip 730, which may include square shaped columns 750 or the other micro pillar configurations described above.

The analyzed mass is calculated from the sample concentration and the volume of water collected during the purged time. During the analysis phase, μPE 704 is taken offline and μTPC 730 is connected in series with μGC column 745, which may be constructed as was described above, with the embedded μTCD 755 detector using a six port switching valve 760. Helium is used as a carrier gas while the outlet of the column is connected to the FID of a commercial Agilent HP7890 GC system for verification purposes. The sensor 762 on the backside of μTPC 730 is used to monitor the temperature profile of the chip when heated by a heater or heating element 763. A voltage applied to heater 763 on the backside of μTPC 730 heats it up from room temperature to 150° C. The desorbed WOCs are separated by μGC 745. A 40 mA current is sourced into a Wheatstone bridge with two resistors of μTCD 755 in each of its arms. The differential voltage measured across the two resistors enables the detection of WOCs, which is fed into a Keithley 2700 and recorded on a LabVIEW program.

The efficiency of the coated column was evaluated with the μTCD switched to the ON condition by applying an 8.3 V DC voltage. This voltage corresponds to a temperature of 95° C. This was measured with helium flowing at the operating pressure of 12 psi. The metric commonly used for column performance is height equivalent to a theoretical plate (HETP) as described above.

The plate number was calculated over a range of column pressures with the constant split injection ratio of 150:1 using chlorobenzene diluted to 2% (v/v) in hexane.

The separation and identification of the four WOCs using only the column and its μTCD (without the μPE and μTPC) was performed by installing the chip inside the GC oven with its inlet and outlet connected to the injector and the GC FID, respectively. A 0.1 ml volume of the sample containing the WOCs diluted to 2% (v/v) in hexane was injected into the μGC column for separation and identification of the four WOCs by the chip.

Similarly, for μTCD response calibration, five samples (0.5%, 10%, 20%, 30%, and 40% (v/v) in hexane) for each WOC were prepared and tested. A 0.1 ml of each sample was injected three times in succession using the GC autosampler module with the split ratio maintained at 150:1. By using the density, the mass for each WOC was calculated taking the split injection ratio into account.

The fabrication of the μTPC was performed on a standard 4 inch wafer using MEMS processing technology. First, photolithography was performed to pattern micro-posts/fluidic ports. The wafer was then subjected to deep reactive ion etching (DRIE, Alcatel) to achieve a depth of ~250 μm. After stripping the photoresist off the front-side, a 500 nm thick oxide layer was deposited on the backside and the wafer diced into individual chips. The chip was then filled with Tenax TA solution (10 mg ml$^{-1}$ in dichloromethane) and allowed to evaporate to deposit a thin film (~200 nm) of the polymer adsorbent on the cavity surfaces. The chip was then capped with a Borofloat wafer by anodic bonding. Following bonding, the chips were loaded onto the platen of an e-beam evaporator (PVD-250, Kurt Lesker) with the backside facing the crucible. The chips were masked by a stainless steel shadow mask patterned with the features defining the heater and the sensor. Following this, 40 nm/100 nm/25 nm of Cr/Ni/Au was deposited to get nominal resistances of 15 ohm and 250 ohm for the heater and the sensor, respectively. Finally, the devices were unloaded; the shadow masks removed off and fused capillary tubes epoxied into the inlet/outlet ports. The fabrication process of the μPE chip followed that of the μTPC but without the adsorbent coating and backside oxide/metal deposition.

For the fabrication of the μGC column with embedded TCD, a two-step anisotropic etching of silicon was performed for hosting the feedthroughs and the microfluidic channel by spin coating the wafer with S1813. A shallow depth of 2-3 μm was achieved which prevented a contact between the metal inter-connects on the Borofloat wafer and the walls of the separation column in silicon upon bonding. A 12 μm thick AZ9260 photoresist was patterned with a mask for subsequent deep etching of the channels resulting in 250 μm deep channels for the separation. Then, TCD resistors were fabricated on a glass substrate by utilizing a lift-off process of a 40 nm/100 nm/25 nm Cr/Ni/Au stack in the e-beam evaporator. After aligned anodic bonding of the diced detector on glass and the diced separation column on silicon, capillary tubes were epoxied into the inlet/outlet ports. The chip was static coated with polydimethylsiloxane by filling it with a solution of 10 mg ml$^{-1}$ OV-1 in pentane, followed by carefully sealing one end with wax and pulling a vacuum at the open end. This procedure left a thin layer of OV-1 coating (~250 μm) on the walls of the column channel.

To avoid changing the concentration of WOCs, a 24 ml cylindrical vial was filled completely with deionized (DI) water leaving no headspace. Both 1 ppm and 500 ppb solutions (v/v) were prepared in two steps. First, 1000 ppm (v/v) solution was made by adding 24 μl of each WOC to 24 ml of DI water. Second, the solution was further diluted 1:24 and 1:12 with DI water to achieve concentrations of 1 ppm and 500 ppb, respectively. The solution was analyzed immediately to avoid compromising the sample integrity. Before processing any sample, all parts of the equipment in contact with the sample were demonstrated to be interference free. This was accomplished through a blank run.

Before evaluating the performance of the integrated purge and trap μGC system, the heating and sensing elements of the microfabricated preconcentrator, separation column, and the detector were calibrated and the separation performance of the column was evaluated.

A 12 V DC voltage was applied to the heater and the sensor resistance was measured until the resistance representing the desired temperature value was reached. The sensor resistance varied with the applied voltage due to ohmic heating. The final temperature of 150° C. was attained within 7 seconds representing a ramp rate of 20° C. s$^{-1}$. This condition remained constant during the desorption process of the WOCs trapped on the Tenax TA polymer coating of the μTPC.

The maximum plate number (optimum condition) observed for the 2 m long column was about 6200 at 12 psi (flow rate 0.62 ml ml$^{-1}$.). The column was operating at this optimum flow condition for further investigations.

The separation and identification of the four WOCs was performed by the method described previously. FID was used to verify the chromatogram generated by the μTCD. WOCs were successfully separated and detected by the chip within 1.5 min. Next, a calibration curve showing the output of the μTCD as a function of the injected WOC concentration was obtained by the method described previously. The injected mass varied from about 3 ng to 23 ng for toluene, 5.4 ng to 43 ng for PCE, 3.7 ng to 29.3 ng for chlorobenzene and 3 ng to 23 ng for ethylbenzene.

Figure 7:
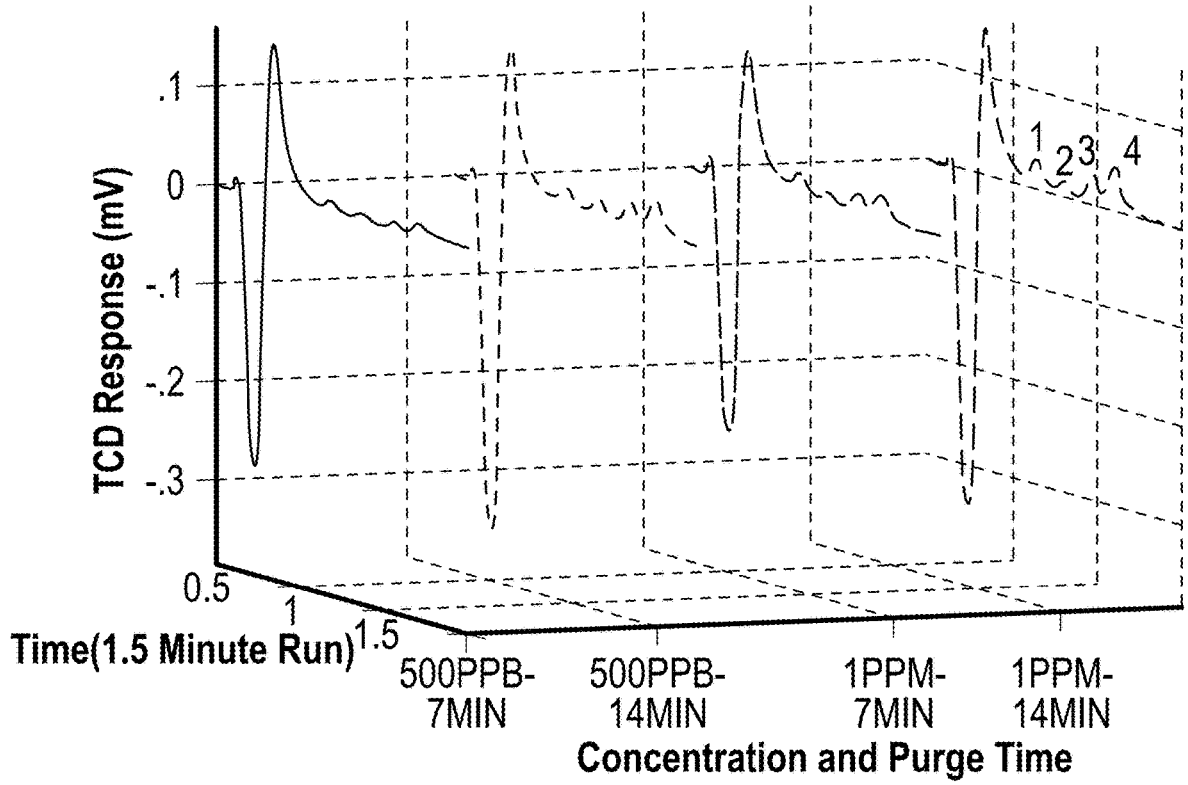
FIG. 7: Set of chromatograms indicating increase in µTCD response with increase in purge time and concentration of WOCs.

Following calibration and performance evaluation of each μGC unit, the μPE was put in place. The ability of the complete system comprising μPE and μTPC chips, separation column, and the thermal conductivity gas detector (μTCD) to continuously monitor WOCs in the aqueous sample was realized experimentally by the method explained earlier. The aqueous solution was introduced into the μPE chip using purified nitrogen at 10 psi. High purity nitrogen gas was supplied through the air inlet of the μPE chip trapping WOCs on the adsorbent surface with a flow rate maintained at 0.4 ml min$^{-1}$ (5 psi) through the μTPC chip. The extraction period was varied for three discrete periods of 7, 14 and 21 min. The set of chromatograms in FIG. 7 was generated using 500 ppb and 1 ppm aqueous samples for two different extraction periods. The initial negative dip is due to the sample mixture passing under the reference detector. At this stage, the signal detector experiences the carrier gas and hence is constant. This results in a negative voltage output as explained before. As the sample mixture moves through the column, it is separated over time. When the individual components pass under the sample detector, the reference detector experiences the carrier gas and hence results in positive peaks corresponding to each eluted compound. The second peak is due to trace moisture extracted from the purge chip and is not seen on the FID signal which is insensitive to the trace water content. The increase in peak heights for all WOCs with the increase in extraction time was observed which validates the design. It is also evident that rapid chromatographic separation and detection of all four WOCs within 1.5 min is achieved at room temperature. The method's precision was evaluated by three repetitive analyses for each test. After each analysis, the μTCP was heated to 150° C. (conditioning step) to prevent carry over from the previous runs, following which a blank run was performed to conform the same. The change in the detector response (area under the peak) with the purge time was then monitored for a sample containing four WOCs at 1 ppm concentration. The experiment was repeated thrice for three different purging times and the average value was plotted for each WOC.

Figure 8:
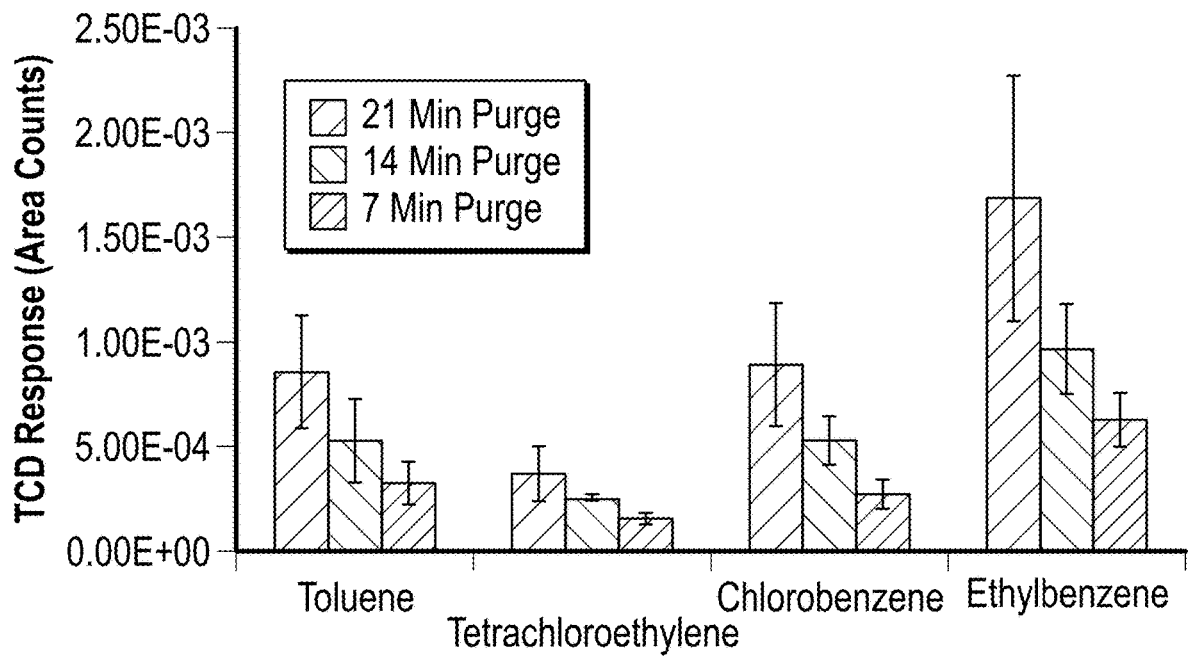
FIG. 8: Graph showing the µTCD response variation with increasing purge time for a sample containing four WOCs at 1 ppm concentration.

FIG. 8 shows that the peak area increases with purging time. The increase in the peak area was attributed to the increase in the quantity of nitrogen (inert gas used) that bubbled through the aqueous sample, and consequently, more quantity of WOC moved from the liquid to the vapor phase. Additionally, in streaming mode, a fresher sample entered the μPE chip replacing the old one, thereby increasing the amount of WOC purged over time. The results in FIG. 8 indicate that ethylbenzene and chlorobenzene are purged easily from the aqueous sample as compared to PCE and toluene. This is due to their relatively high partition coefficient ($K_{ow}$) value, which is defined as the ratio of concentration of a compound in a hydrophobic solvent (usually octanol) to its concentration in water at equilibrium. In other words, it is a measure of hydrophobicity and depends on size, polarity and hydrogen bond strength of a compound. Hydrophilic compounds (with low partition coefficient) are held by a very strong dipole-dipole interaction and hydrogen bond in water and thus could not be easily purged from the sample. Increasing the temperature of the sample should increase the purged amount by supplying enough thermal energy to the molecule to break the dipole-dipole interaction. The sample analyzed during the purge time was collected to determine the percent recovery of each compound. Assuming that the trap is able to capture the entire purged amount, percent recovery is defined as the ratio of the amount that is collected for chromatographic analysis relative to the amount that was originally present in the aqueous sample. Table 5 summarizes the percent recovery for each compound at 1 ppm concentration.

TABLE 5

List of water organic compounds with their originating sources and potential health risks

| Contaminants | Potential health effect | Contamination sources | Amount recoverd (ng) | Recovery | log($K_{ow}$) | MCL |
|---|---|---|---|---|---|---|
| Toluene | Nervous system, liver problems | Petroleum factories | 5.7 | 23% | 2.75 | 1 mg l$^{-1}$ |
| PCE | Liver problems, increased risk of cancer | Discharge from factories and dry cleaners | 5.4 | 18% | 2.57 | 5 μg l$^{-1}$ |
| Chlorobenzene | Liver and kidney problems | Discharge from chemical and agricultural chemical factories | 9 | 25% | 2.86 | 0.1 mg l$^{-1}$ |
| Ethylbenzene | Liver and kidney problems | Petroleum refineries | 18.7 | 38% | 3.14 | 0.7 mg l$^{-1}$ |

The percent recoveries are lower than those reported in the literature. This can be attributed to the fact that commercial purge and trap systems use high purging gas flow rates (normally 40 ml min$^{-1}$) and also use traps consisting of a short length micro-bore tubing packed with the granular form of the adsorbent material. Such traps at the cost of high pressure drops and high power consumptions can provide higher adsorption capacity. It is notable that low recoveries have also been reported previously by Sandia National Laboratories in their bench-top (WASP) system described earlier due to the flow limitations in their setup. In addition, embodiments of the present invention have achieved a detection limit of 500 ppb, which is comparatively higher than the commercial purge and trap systems. Part of this is attributed to small sample volumes (in ml) analyzed by the μPE chip when compared to the commercial purge and trap systems.

The present invention, in yet other embodiments, provides a micro-scale version of a purging device for the extraction of WOCs from an aqueous sample. The potential application of the chip for on-site monitoring of the aqueous sample when equipped with all necessary μGC components as described herein. In other embodiments, to enhance the recovery of analytes may be accomplished by modifying the design of the μPE chip and integrating temperature programming ability on this chip.

As shown in FIGS. 9A-9D and FIGS. 10A-10B, in another embodiment, the present invention provides a detector that has two major units: 1) sampling and preconcentration, and 2) separation and detection. μPC 1500 chip and μSC-TCD 1502 chip have integrated thin film heaters 1505 and 1506 and sensors 1510 and 1512 which are used for temperature control during desorption and separation. The microfabricated components may be integrated with off-the-shelf flow controllers to implement GC flow cycles—loading, injection, analysis, and cleaning. An embedded platform, based on an 8-bit microcontroller (ATmega640, Atmel Corporation), is responsible for fluidic and thermal control. It also implements a user interface, signal processing, and data acquisition circuitry. The system is highly portable, battery powered, and easy to operate. It can be paired with a laptop for device control and data visualization through a Labview application.

μPC 1500 is a 13 mm×13 mm silicon-glass chip and consists of an array of high aspect ratio micro-posts inside its 1 mm square cavity. Micro-posts 1520-1524 are realized by bulk micromachining of a 4 inch silicon wafer utilizing a deep reactive ion etching process to achieve a depth of 240 µm. Micro-posts 1520-1524 may also be configured as described above.

A 1-µm thick plasma enhanced chemical vapor deposition (PECVD) oxide layer that acts as an insulator is deposited on the backside. The wafer is then diced into individual chips. The micro-posts are then coated with a thin film (~200 nm) layer of adsorbent 1530 which may be Tenax TA followed by capping with a Borofloat wafer via anodic bonding. A 40 nm/230 nm of Cr/Ni stack is deposited which serves as a heater and temperature sensor on the backside of the chip using an e-beam evaporator (PVD-250, Kurt Lesker). The nominal resistance of the heater and sensor is around 15 ohm and 250 ohm, respectively. Finally, fused capillary tubes are inserted and epoxied to the inlet/outlet ports.

For the µSC-TCD, a two-step anisotropic etching of silicon is performed. First, a shallow depth of 2-3 pm is achieved which prevents the contact between the metal interconnects on the Borofloat wafer and the walls of the separation column in silicon upon bonding. Second, a 2 m long, 70 µm wide and 240 in deep channel is etched into the silicon wafer. TCD resistors 550 are fabricated on a glass substrate using a lift-off process for a 40 nn/100 nm/25 mu Cr/Ni/Au stack deposited employing the e-beam evaporator. The glass and silicon substrates are then aligned and bonded together. The heaters and temperature sensors are fabricated on the backside of the chip using stainless steel shadow mask. Afterwards, the capillary tubes are epoxied into the inlet/outlet ports. The chip is finally coated with a thin layer (~250 nm) of OV-1 on the walls of the column channel.

An SEM image of the Tenax TA and OV-1 coating is shown in FIG. 9. The optical image of all fabricated chips is shown as well.

The microfabricated components may be integrated with a (Parker Hannifm Co), multi-way valves (The Lee Co.), and a portable helium cylinder. System control is through an integrated electronic module managed by an 8-bit microcontroller. Latching valves are selected to optimize power consumption and controlled by applying a 100 ms 5 V DC pulse through an H-Bridge. The pump flow rate is adjusted by varying the pulse-width modulation (PWM) duty cycle, which is an important parameter during sample collection. The on-chip temperature sensors 1510 and 1512 are connected in a 3-wire resistance temperature detector (RTD) configuration by using two well-matched current sources with a high precision 24-bit ADC. The reference voltage for the ADC is also generated using these matched current sources through a precision resistor and applied to the differential reference pins of the ADC. This scheme ensures that the span of the analog input voltage remains ratio-metric to the reference voltage and any error in the former due to temperature drift of the excitation current is compensated by the variation of the latter.

On-chip heaters 1505 and 1506 are controlled through PWM channels and a digital proportional control system is implemented as part of the embedded firmware, which generates different profiles for temperature reference signal based on the user input (initial temperature, step, ramp, final temperature).

The µTCD is connected in a Wheatstone bridge, driven by 7.5 V DC, with low noise thin film resistors (PF1260 series, Riedon Inc). The differential signal is conditioned and filtered prior to feeding into an ultra-low noise 24 bit ADC (AD7793, Analog Devices). The signal is further filtered digitally, using an on-chip low pass modified Sin c3 filter that also provides 60 Hz rejection. The TCD, along with the entire system, is operated at a data rate of 10 Hz, which provides substantial resolution for the peaks.

Figure 10C:
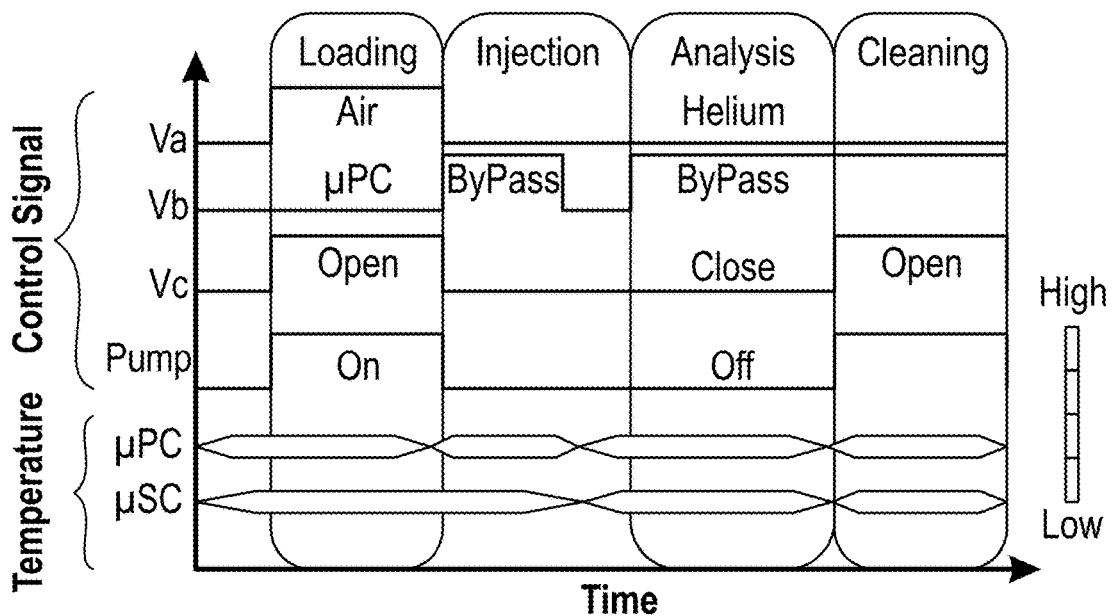
FIGS. 10A. 10B and 10C: (A) GC system block diagram of one embodiment of the present invention, (B) Operation cycles and timing, (C) Operation temperature, control Signal and Time.
Figure 9A:
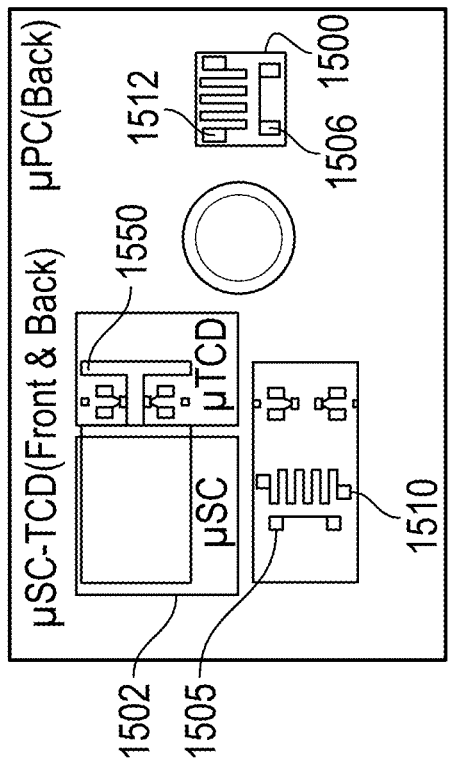
FIGS. 9A, 9B, 9C and 9D: (A) Micro-devices (B) images showing micro-posts in µPC (C, D) polydimethylsiloxane coating on the interior wall of the column channel.
Figure 9B:
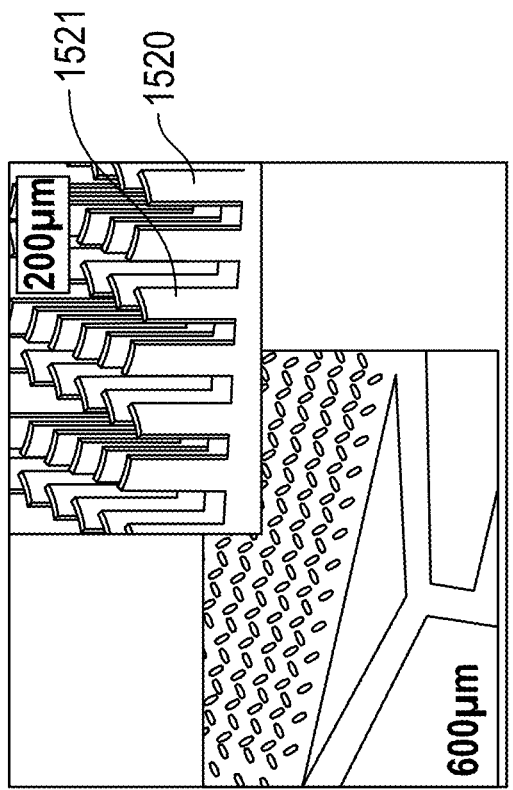
Figure 9C:
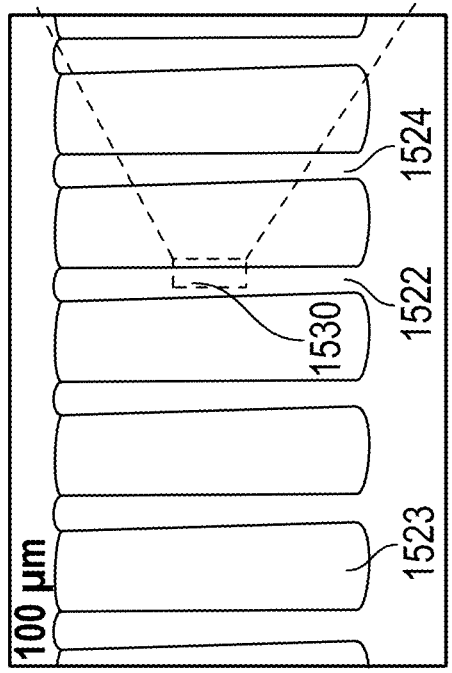
Figure 9D:
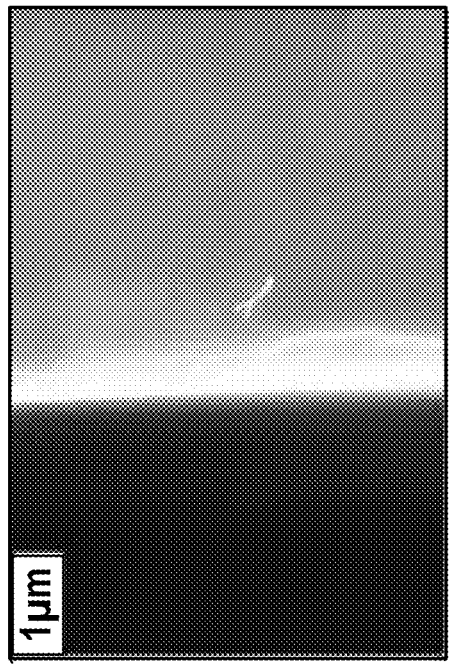
Figure 10A:
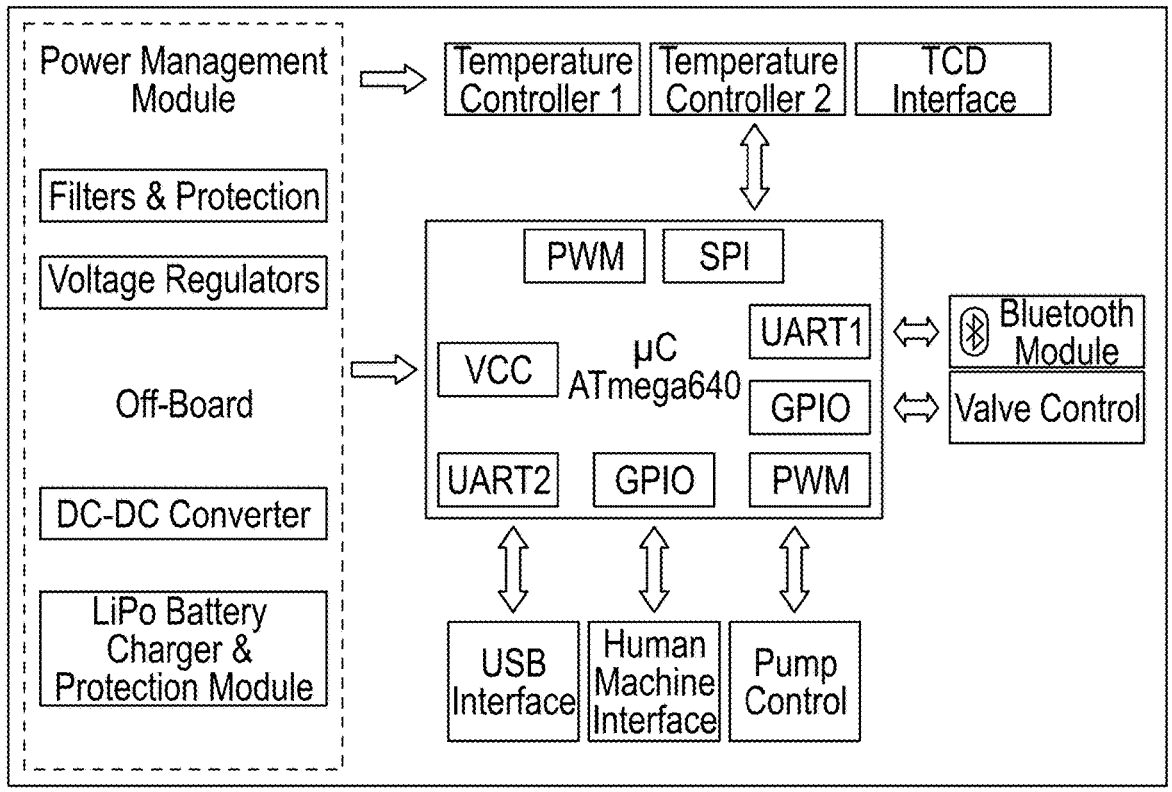
Figure 10B:
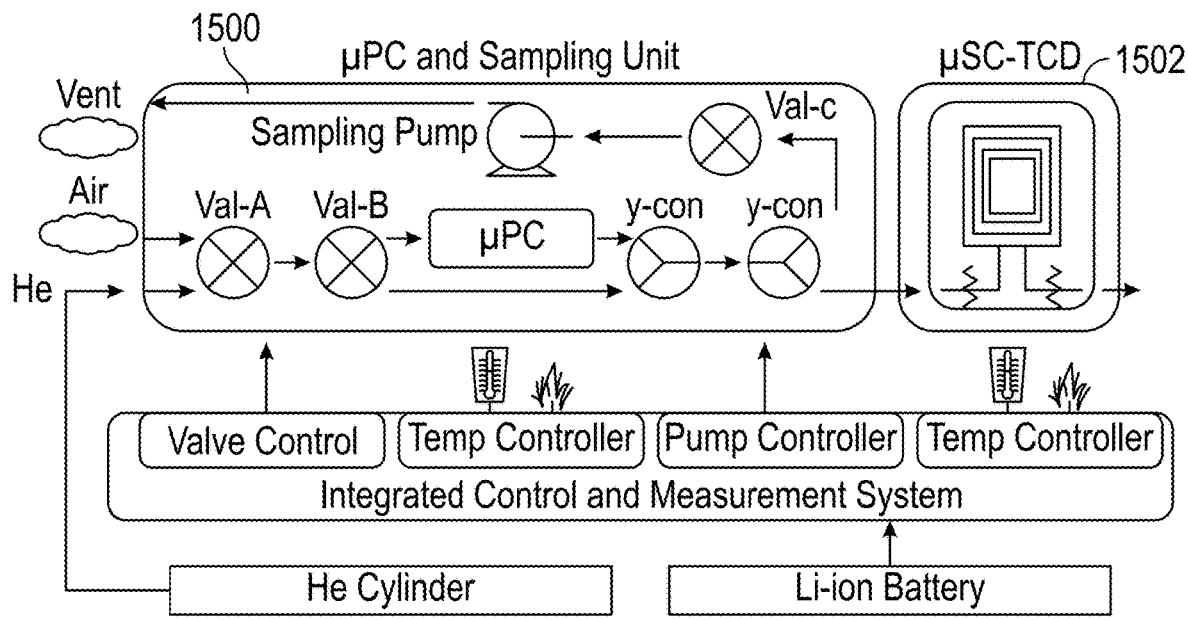

Microfabricated components along with the flow controllers, integrated electronic module, and user interface circuitry are assembled in a 30 (l)×15 (w)×10 (h) box, schematically shown in FIG. 10-a. The box also houses a lithium ion battery (2200 mAh) pack and a small helium cylinder (95 uff, 2700 psi) to make the GC highly portable (~1.8 kg). The system can be operated in a manual or automatic mode using the LCD/Keypad based human-machine interface, which has a menu driven system. Once the mode is selected, the screen shows the state of the system in terms of valve positions, temperature readings, pump duty cycle, and sensor value. Sensor data can be visualized and recorded in the Labview application, which receives data packets through USB or Bluetooth interface.

FIG. 10-b shows the timing diagram for the following automated stages: loading, injection, analysis, and cleaning. In the loading stage, the pump applies negative pressure at the µPC outlet to load it with VOCs present in the air sample. Once a sufficient sample is loaded in the µPC, the valves are switched to flow helium through the bypass path into the µSC-TCD. In order to ensure a sharp injection plug, the µPC is heated first at a rate of 25° C./s to 200° C. without flow, and then the valve is switched to inject analytes into the µSC-TCD. The valve is switched back to the bypass path after injection and this stage typically lasts 10-12 s. Once the analytes are injected, they are separated and simultaneously identified in the µSC-TCD. This separation for the analytes of interest (BTEX) takes ~1-2 min; the µSC can be operated at higher temperatures to reduce the analysis time or to resolve higher boiling compounds. Once the analysis phase is complete, the valves are switched back to flow helium at a rate of 3 mL/min through the µPC. The µPC is heated several times if necessary, to minimize residual analytes from the previous run. Typically, one temperature cycle (10-12 seconds) is sufficient to desorb the remaining analytes because of the high desorption efficiency of our silicon-based µPC.

The integrated electronic module primarily consists of temperature controllers, TCD interface, flow controllers, user interface, and data acquisition circuitry. Each module was tested and optimized separately before integration. For accurate temperature measurement, on-chip sensors were calibrated by placing the MEMS devices in a conventional GC (7890, Agilent, Palo Alto, Calif.) oven to characterize sensor resistance that responded linearly with respect to temperature with correlation coefficient of (le)>0.99. The calibration was completed by updating the firmware with calibration slope and offset, which were computed from the resistance vs. temperature data. The temperature profile required for the µPC is very different from that required for the µSC; the former requires heating at a high ramp rate (20-100° C./s) to quickly desorb the analytes and generate a sharp injection plug, whereas the µSC requires heating at much lower ramp rates (0.2-1° C./s) during the analysis phase to accelerate elution of high-molecular weight analytes. The µPC temperature reference was generated through the firmware, and a step input was given to heat the µPC to 200° C., which was sufficient to completely desorb 99% of the analytes of interest. The heating ramp rate depends on the thermal mass, power dissipated, and heat losses.

A maximum heating ramp rate of 25° C./s was achieved for the µPC, by applying an 18 V DC across the heater resistance (15 LI). Further increases in the voltage resulted in deterioration of the thin film heater due to high current density. The μSC was temperature programmed for ramp rates of 20° C./min and 30° C./min. The power consumptions were determined to be 0.5 W and 1.2 W for isothermal operation of the μSC at 45° C. and 65° C., respectively.

The sensitivity of the μTCD detector was improved by increasing the signal-to-noise (S/N) ratio. The signal was amplified (Gain 32), and the noise was reduced by filtering the signal and packaging the detector in a small aluminum box to mitigate the effects of ambient fluctuations. Once the measurement circuitry was tuned, noise measurements were made under normal operating conditions with the carrier gas flowing and the μTCD turned ON. The average peak-to-peak detector noise was 8.08 μV and measured for baseline signal captured for 10 s. The power consumption for the μTCD and pump operation was 280 mW and 165 mW, respectively. The full measurement cycle of the GC consumes an average power of 2.75 W meaning that the battery can last up to 8 hours (~110 full cycles). It is notable that in one embodiment, each helium refill (95 mL, 2700 psi) will last around 10,000 full cycles, meaning that the size of the helium cylinder and subsequently the GC can be considerably reduced.

For optimum operation, the μPC was characterized in terms of four parameters: adsorption capacity, breakthrough volume, desorption peak width, and desorption efficiency. While evaluating the maximum adsorption capacity of the μPC, the effect of flow rate on the adsorption process was minimized by keeping it to a low value of 1 mL/min analytes were injected into the μPC from headspace in sealed 1 mL vials using a conventional GC autosampler module. The split ratio and the injection volume were changed to vary the amount of analyte introduced into the μPC. Analytes not retained by the adsorbent bed appeared as a breakthrough peak, which was allowed to return to the baseline prior to heating the μPC. The maximum adsorption capacity was defined as the mass retained in the μPC when the injection led to ~10% immediate breakthrough. The μPC can adsorb ~30-400 ng of analytes depending on their affinity to Tenax TA. The masses retained were ~30 ng, 130 ng, 240 ng, and 350 ng for benzene, toluene, chlorobenzene, and ethylbenzene, respectively. These results indicate that the μPC can retain a sufficient amount of compound well above the detection limit of μTCD (~1 ng) and that it has higher affinity to high boilers.

For breakthrough volume (BV) identification, about 4 ng of each analyte was loaded separately on the μPC at a flow rate of 1 ml/min and then 5, 10, 15, 25, and 30 mL of the carrier gas was passed through the μPC at the same flow rate. The μPC was subsequently heated and the volume of carrier gas, which resulted in a 10% reduction in the total mass retained, was noted.

Another important parameter is the width of the desorption peak that can directly influence the chromatographic resolution achieved by the separation column. The initial desorption peak width attained on the μPC at a ramp rate of 25° C./s and flow rate of 1 mL/min, was 4 seconds. This was reduced by first heating the μPC without the carrier gas flowing and next, passing the carrier gas through when the chip temperature reaches 200° C. This flow-manipulation technique resulted in a reduction of the peak width at half height (PWHH) from 4 to 8 seconds.

A minimum PWITH of 350 ms was achieved when the desorption flow rate was increased to 2.5 mL/min. It is notable that 99% desorption efficiency for the analyte of interest was achieved by heating the μPC to 200° C. The remaining amount was removed by subsequent heating of the μPC prior to another run to minimize carry over from the previous adsorption run.

The efficiency of the coated column was evaluated with the μTCD switched ON by applying a 7.5 V DC to the Wheatstone bridge. This voltage corresponds to a temperature of 80° C. for the μTCD and was measured with helium flowing. The heated μTCD elevated the temperature of the column to 32° C. The metric commonly used for the column performance is the height-equivalent-to-a-theoretical-plate (HETP).

The plate number was calculated over a range of column pressures. The maximum plate number (optimum condition) observed was ~6200 for 2-m long column at 12 psi (flow rate of 0.7 mL/min).

Further, the embodiment was tested for the separation and identification of six VOCs using the column and its μTCD. The μSC along with the interface circuitry was installed inside a conventional GC and connected to the injection port and FD with fused-silica capillaries. A mixture of 6 compounds (headspace), containing benzene, toluene, tetrachloroethylene, chlorobenzene, ethylbenzene, and p-xylene, was injected by autosampler through the heated injection port (1 μl, 50:1 split ratio). The peaks were found to be well resolved and the separation required less than 2 minutes. Next, a calibration curve showing the output (peak area) of the μTCD as a function of the VOC injected mass was obtained. For that purpose, a headspace sample for each VOC was prepared and tested. The split ratio was varied from 120:1 to 50:1 based on the vapor pressure of the VOC. Injected volumes were varied from 0.5 μL to 4 μL, to achieve the mass injected in the range of 1 to 5 ng.

Figure 11:
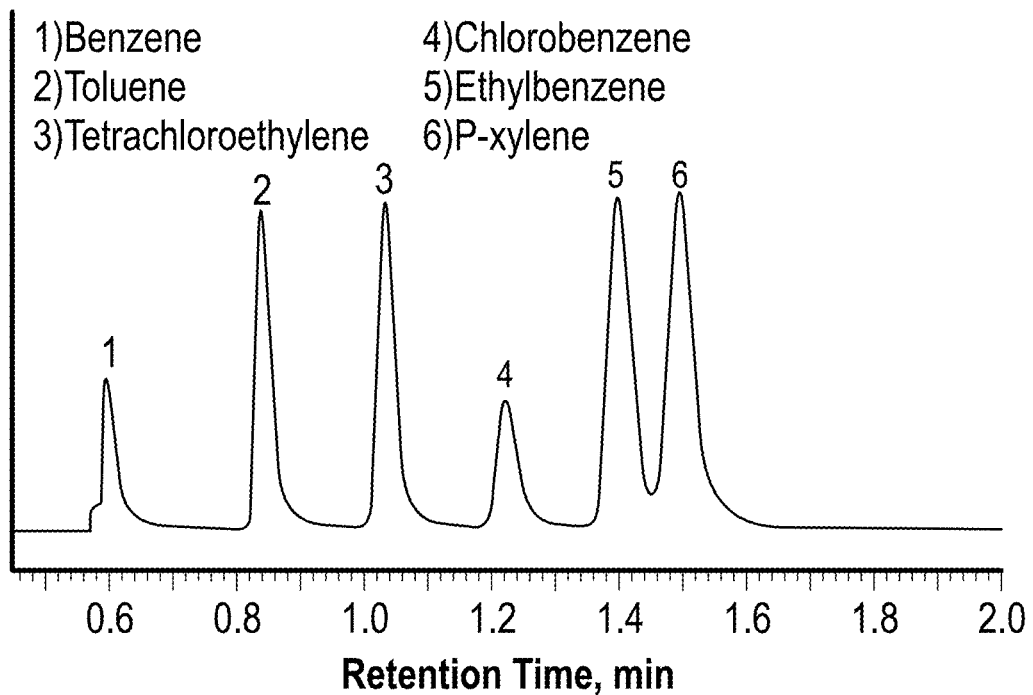
FIG. 11: FM response for separation of test compounds with integrated µPC and µSC. Injection performed using flow manipulation technique with µPC heated to 200° C. and desorption flow rate set to 1 mL/min.

Once individual chips were tested, the μPC was connected upstream of the μSC-TCD to test the hybrid integration. The integration was expected to both improve and compromise the system performance of different aspects of the μGC. The compact design reduced the transfer lines, thereby reducing the formation of a cold spot that decreases efficiency. On the other hand, the optimal flow rate for operating the μPC and MSC was different; therefore, there was a trade-off in establishing the flow rate for the integrated system. The inlet port of the μPC was connected to the GC injector (280° C., split ratio 50:1) and it was loaded with a mixture containing six compounds (headspace, 1 μL). For initial testing, the outlet port of μSC was connected to the FID detector of a conventional GC. The flow rate was set to 1 ml/min, for which the PWHH was measured to be 0.8 seconds from the μPC and the μSC exhibited well resolved peaks for the analytes of interest. As shown in FIG. 11, the six compounds were separated and identified in less than 2 min.

Figure 12A:
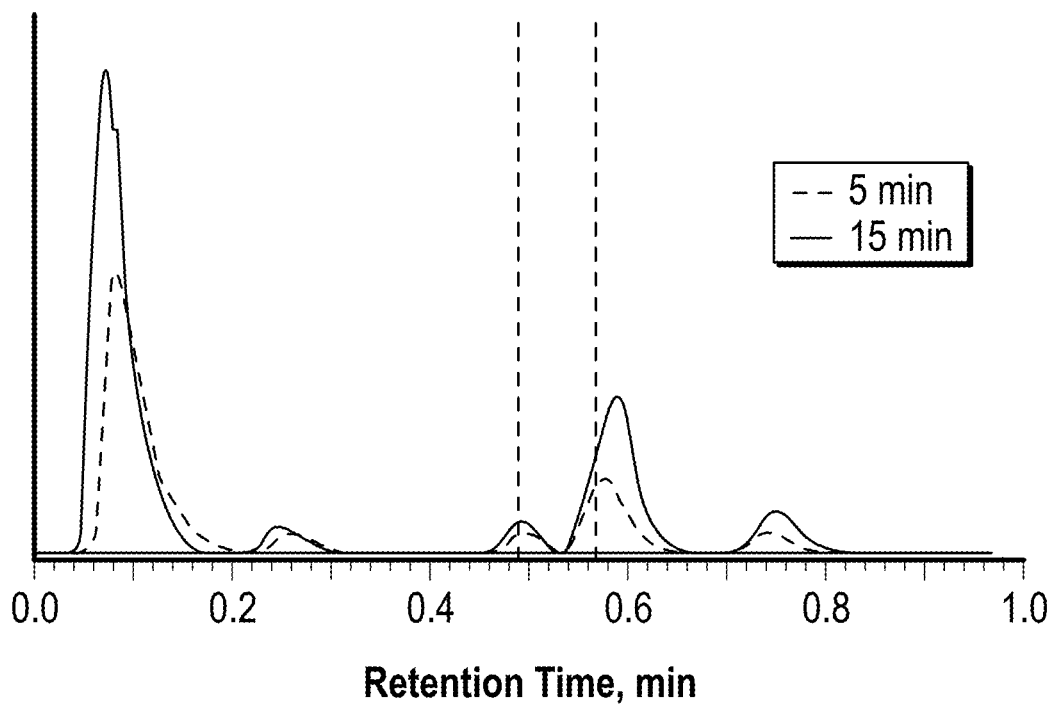
FIGS. 12A and 12B: Chromatogram of (A) gasoline vapor and (B) standards using Zebra GC
Figure 12B:
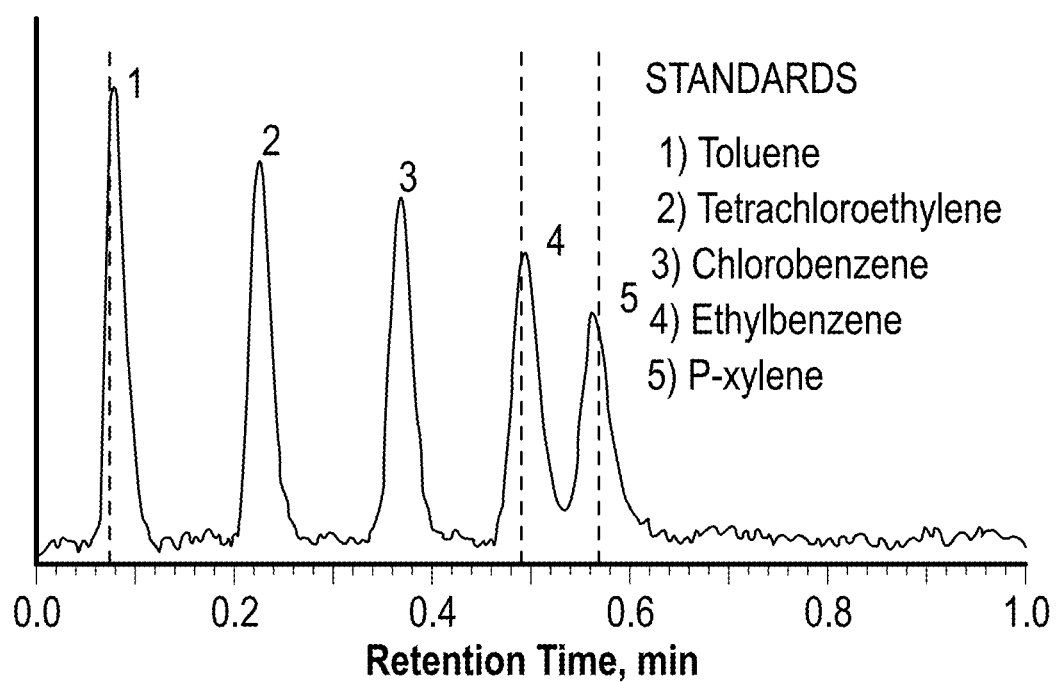

The TCD is sensitive to flow perturbation during the switching of carrier gas into the μPC; therefore, the integrated μTCD presented some challenges because of interference stemming from the injection of the analytes by the μPC. The problem was solved by adopting an innovative system architecture. As shown in FIG. 10-*a*, an alternate flow path for the μPC was provided to maintain a steady flow in the μSC-TCD during the injection cycle. The fluidic resistance of the alternate flow path was matched closely with that of the μPC path to minimize flow perturbations while switching between the two paths. The new architecture decreased the μTCD stabilization time by one order of magnitude (from 1-2 min to 10 seconds) and ensured continuous flow of the carrier gas as shown in FIGS. 12A-12B.

The components of the GC were assembled as schematically shown in FIG. 10-*a*. In addition to the integration of µPC and µSC-TCD mentioned above, a Y-connector may be added between them to connect the small pump through a valve. The connector isolates the loading path of the µPC from the µSC-TCD, which reduced contamination in the µSC-TCD. This also permits loading at higher flow rates to the µPC since the high fluidic resistance in the µSC was avoided.

The GC was tested by loading the system with a mixture of five compounds (headspace), containing toluene, tetrachloroethylene, chlorobenzene, ethylbenzene, and p-xylene, injected by the GC autosampler through the heated injection port (2 µL, 40:1 split ratio) at 1 mL/min. As shown in FIG. 12-b, calibration standards were generated with this method. The injected mass ranged from 1-3 ng, which is equivalent to 10 mL loading of ~100 ppbv gas mixture, approximating a 10-min loading using a pump operated at 1 mL/min The test was performed three times and retention times were highly repeatable with an RSD less that 1.3% for all analytes. The peak areas and peak heights had average RSDs less than 4.7% and 8%, respectively.

Figure 13:
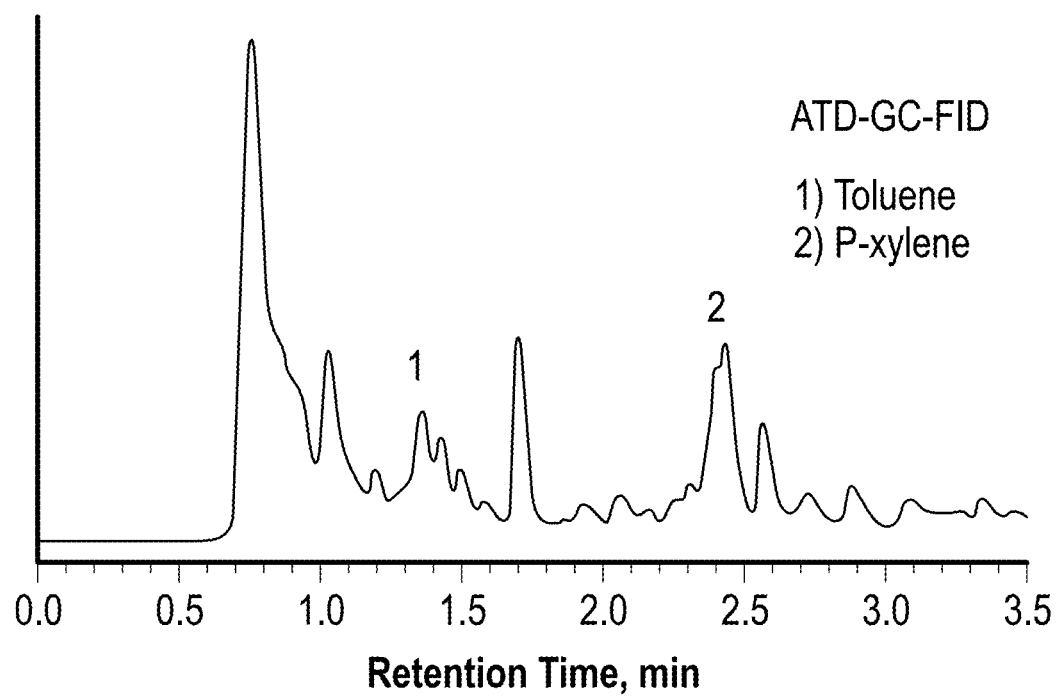
FIG. 13: Chromatogram of gasoline vapor sampled at ambient pressure and temperature using sorbent tubes containing ~200 mg of Tenax TA. Gasoline vapor was analyzed by thermal desorption coupled to GC-FID using conventional column containing (5% phenyl-, 95% dimethyl-polysiloxane). Desorption temperature and time were 300° C. and 25 min respectively. Toluene peak at ~1.4 min (16 ppmv) and p-xylene (14 ppmv) peak at ~2.4 min. Benzene and ethylbenzene not detected. Temperature programming: 35° C., hold for 10 min, 5° C./min to 150° C., final hold time 1 min.

The fully-assembled GC was evaluated in a simulated environment using gasoline as the source of exposure. The test atmosphere was generated by placing 50 mL of gasoline in a 100 mL beaker that was placed inside a large glass chamber (~4 L). Air was circulated inside the chamber but outside the gasoline beaker at 500 ml/min to simulate a car refueling scenario in which gasoline vapors displaced from the tank disperse in the atmosphere, where they may be inhaled. The top of the chamber was kept open to the atmosphere and the chamber was allowed to be filled with vapors for 10 minutes. The vapors were sampled through the µGC, by keeping the system inlet close to the top of the chamber. Vapors were sampled under ambient temperature and pressure for two different sampling times, 5 and 15 minutes. To compare results with a conventional sampling system, gasoline vapors were also sampled using sorbent tubes packed with Tenax TA at a sampling flow rate of 69 ml/min for 3 hours. Sorbent tubes were desorbed using a thermal desorption system coupled to a GC-FID (TD-GC-FID, Perkin-Elmer ATD 400). Toluene and p-xylene were identified at a concentration of 16 and 14 ppmv, respectively (FIG. 13). In both systems (GC and TD-GC-F1D), benzene was not identified because it co-elutes with the other low-boiling point components in gasoline. FIG. 12-a illustrates that the GC detected five peaks, three of which were identified as toluene, ethylbenzene, and p-xylene based on retention times. Also, because Tenax TA has low affinity to benzene, the µGC system retained lesser mass of it compared to the other analytes. The sample volume collected and analyzed in the µGC was ~3 orders of magnitude lower than those collected on sorbent tubes. These results illustrate that the present invention is capable of detecting and separating compounds with a much shorter sampling time and lower sample volume compared to conventional systems to complete one full cycle of analysis.

In other embodiments, the present invention provides a µGC system suitable for environmental monitoring applications. The system leverages micromachined components to achieve low power consumption (2.75 W) and fast analysis time (4.4 min). A Limit of Detection (LOD) of ~1 ng was achieved, which enables monitoring of HAPs at sub-100 ppbv concentrations. In yet other embodiments, a deep-etched µPC, enabling high sample volume, and utilizing semi-packed/multi-capillary columns for increased separation efficiency may be provided.

Figure 14:
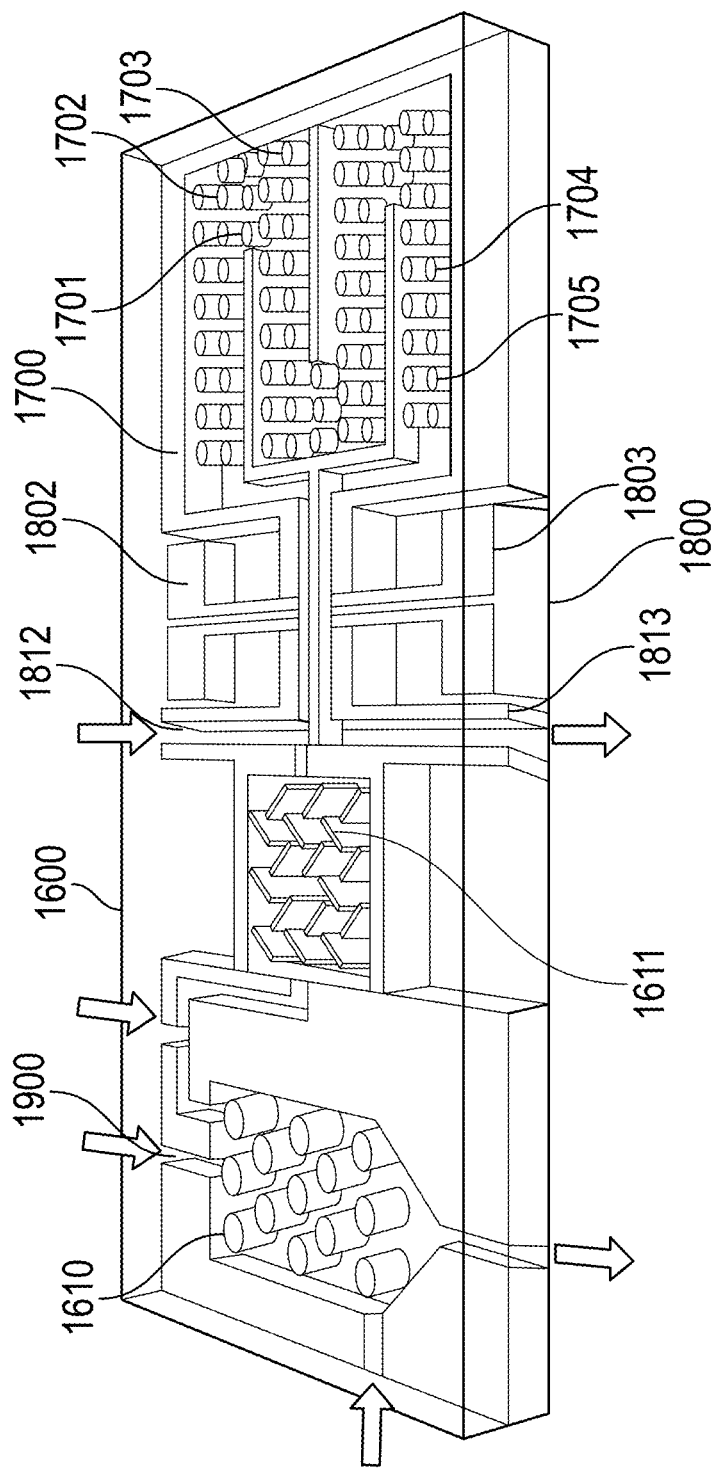
FIG. 14: A µPTGC chip of an embodiment of the present invention.
Figure 15:
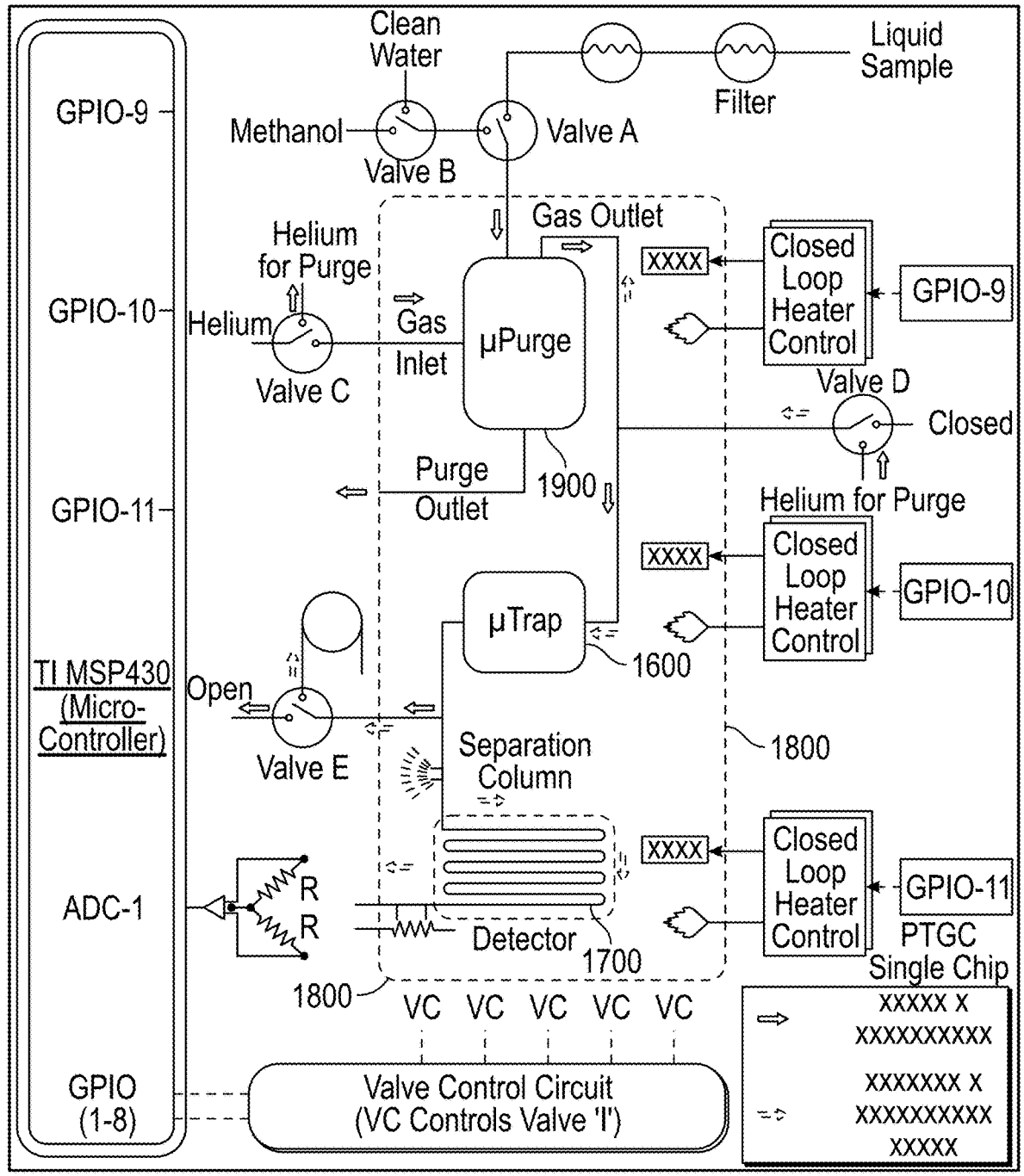
FIG. 15: Schematic of the interface of the µPTGC chip with a Texas Instruments MSP430 series controller for automatic operation of the system, for on-site water monitoring. Valve A and B are inert control valves (LFYA1226032H) while the rest are (LHLA0531111H) latching low power valves, from The Lee Co. The pump (270 EC-LC-L) from Schwarzer Precision consumes 0.6 W. A 0.2 pm filter (WU-81054-42) from Cole Parmer precedes the pump. A 14 oz., 48.8 Wh, 11.1V Li-Ion battery powers the system.

FIGS. 14-15 show another embodiment of the present invention. FIG. 14 shows various column patterns of designs that may be used with µTrap as well as with the other components described above such as µPC, µGC, µPE, µTPC, µTCD and µSC. Specifically, traps and concentrators are concentration amplifiers used to improve the detection limit of an analytical system. Preconcentration may be achieved by collecting analytes on an adsorbent material or medium over a period of time. The collected samples are then released via rapid thermal desorption in the form of a highly concentrated plug for subsequent chemical analysis. In one embodiment, micro pillars may be round 1610 or elongated and in a zigzag pattern 1611 and/or in other configurations as described above to increase the effective surface area of the device and/or to ensure the enhancement of gas molecules interaction with the adsorbent surface. The pillars may also be coated with Tenax TA thin film using an inkjet printing technique. In addition to its high adsorption capacity and thermal stability (up to 450° C.), one interesting feature of Tenax TA is its low affinity to water making it a suitable adsorbent for the extraction of VOCs from aqueous samples.

In yet another embodiment, the present invention enhances the adsorption capability of the Tenax TA poly (2,6-diphenylene oxide) through its deposition on a nano-structured template. Modified Tenax TA-coated $SiO_2$ nanoparticles (SNPs) are incorporated as an adsorbent bed in silicon based micro-thermal preconcentrator with an array of microposts as described above embedded inside the cavity and sealed with a cover. The interior surface of the chip is first modified by depositing SNP using a layer-by-layer self-assembly technique followed by coating with Tenax TA. The adsorption capacity of the SNP-Tenax TA medium is enhanced by as much as a factor of three compared to thin films of Tenax TA. The increased adsorption ability is attributed to the higher surface area provided by the underlying porous SNP coating and the pores between SNPs affecting the morphology of deposited Tenax TA film by bringing nano-scale features into the polymer.

In addition, SNPs may solely be used as the adsorbent. The medium may be created using a layer by layer coating technique. In addition, surface functionalization may be undertaken using silanes as described.

In one preferred embodiment, the present invention has achieved more than 10,000 concentration factors for the disclosed MEMS-based µpTraps. Separation columns 1700 may be used to separate a mixture of gases into its constituents. The column is basically a long channel whose walls are coated with a stationary phase, as described above, that is responsible for the separation of the various gaseous species. As shown, column 1700 may be serpentine in configuration to reduce the overall footprint of the detector. Other channel configurations may be used. In one alternate embodiment, the present invention provides a linearly-variable column (LVC) and the other a step-gradient column (SGC). In some preferred embodiments, the width of a 1 m long 250 µm-deep LVC is gradually reduced from 120 µm to 20 µm at 1 µm/cm. While that of a 1 m-long SGC is modulated in five steps (120 µm, 95 µm, 70 µm, 45 µm and 20 µm) each with a length of 20 cm.

Microfabricated columns typically are comprised of high-aspect-ratio rectangular channels etched in silicon and laid out in circular or square-spiral configuration. In other embodiments, MEMS columns including semi-packed (having embedded micro posts 1701-1705) and multicapillary (having parallel channels) and demonstrated columns with 12,000-20,000 number of theoretical plates per meter, the highest reported separation efficiencies in µGCs. In other embodiments, serpentine microfabricated semi-packed columns (μSPC) with three circular micro pillars (20 pm-wide, 20 pm-post spacing) embedded along a 1 m-long and 150 pm-wide microfluidic channel may be used.

As shown in FIG. 14, unlike conventional TCDs, in one embodiment, the present invention provides a monolithically integrated detector that includes μPurge section 1900, μTrap section 1600, μTCD section 1800 and separation column 1700. μTCD 1800 includes a first resistor 1802 located at the inlet 1812 of separation column 1700. μTCD 1800 also includes a second resistor 1803 located at the outlet 1813 of separation column 1700. This configuration reduces reagent usage by eliminating the need for a reference channel with a carrier gas.

In use, the overall size of the μPTGC chip will be about 25 mm×90 mm. The chip will be connected to auxiliary micro/mini systems including a pump, valves, and a small cylinder of compressed helium gas as schematically shown in FIG. 15. The chip operation has 4 stages. In the purge and trap stage, water from sample source flows into the μPurge 1900 through the water inlet. Helium through the gas inlet purges the WOCs, through the gas outlet, to be adsorbed in μTrap 1600. An elevated temperature in the μPurge enables easier extraction of WOCs. In the next stage, temperature of the μTrap is raised to remove the low boilers out through Aux-2. In the third stage, the temperature of the μTrap is raised further to release the target into the separation column 1700, resulting in their separation and detection by detector 1800. In the final stage, the μTrap and μSPC are raised to a higher temperature to condition and prepare for the next run. It should be noted that after the initial purge and trap stage, the μPurge is cleaned with DI water and methanol to prevent microbial growth. The valves, pump and chip heating circuitry require signal coordination to lead through the stages with minimal computation workload. This, combined with the fact that the unit must be portable and compact, warrants the use of a low power processor with multiple sleep modes. By far the most popular in this class is the Texas Instruments MSP 430 series processors available with various cache, memory size and on-chip peripheral specifications. A low 100 nA sleep current and a wake-up time of few microseconds makes it well suited for on-site deployment.

In other embodiments, the present invention provides a method of fabricating a separation column for use with a gas chromatograph. An oxide, such as a metal oxide or even an aluminum oxide, is deposited by atomic layer deposition to create a stationary phase medium on the separation column. The oxide may be deposited as a plurality of layers with each layer deposited in a cycle comprising (a) exposure to trimethylaluminum (b) purge (c) exposure to water (d) and purge. In a preferred embodiment, each cycle deposits a layer of about 1-2 angstroms. The oxide, including the aluminum oxide, may be functionalized by exposure to one or more silanes. In other embodiments the silane is an alkylsilane or is chlorodimethyloctadecylsilane.

In yet other embodiments, the present invention provides a detector having a micro-purge extractor in communication with a micro-scale gas chromatography column for the extraction and analysis of water organic compounds from an aqueous sample. The micro-purge extractor has a cavity in communication with a sample inlet port, a purge gas inlet port, a waste outlet port and a purged water organic compound outlet port, The sample inlet port is adapted to receive an aqueous sample. The purge gas inlet port is spaced apart from the sample inlet port and adapted to receive inert gas, which is used to purge water organic compounds from the cavity of the micro-purge extractor. The waste outlet is opposingly located from the purge outlet port, and the waste outlet is adapted for draining water from the chip. The purge outlet in is communication with a micro-thermal preconcentrator, which is adapted to absorb and desorb water organic compounds. Also included is at least one resistive heating element that when activated, causes the water organic compounds to be desorbed. Lastly, the micro-scale gas chromatography column is adapted to separate the water organic compounds and a micro-thermal conductivity detector is used to identify the water organic compounds. The separation column may have an oxide, metal oxide or aluminum oxide stationary phase medium, which may be functionalized by exposure to one or more silanes. The silane may be an alkylsilane or a chlorodimethyloctadecylsilane. The purge outlet port and the sample inlet port are located on a top side of the micro-purge extractor and the purge gas inlet is located on a side of the micro-purge extractor, and the waste outlet port is located on a bottom side of said micro-purge extractor.

In yet other embodiments, the present invention provided a detector for detecting hazardous air pollutants at parts-per-billion concentrations in complex mixtures. The detector includes a microfabricated preconcentrator, a separation column with an on-chip thermal conductivity detector, a controller for controlling flow and thermal management and a user interface. The thermal conductivity detector includes a first resistor located at an inlet of the separation column and a second resistor located at an outlet of the separation column. The separation column includes a medium comprised of silica a nanoparticle layer with a Tenax TA coating. In other embodiments, the separation column may include at least one channel that linearly decreases in width and/or at least one channel that decreases in width in a stepwise fashion.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure. For example, while the terms adsorb, absorb, adsorption and absorption are used herein, the intention of the application is to use all term interchangeably with the broadest meaning applied to all without any one term having a narrower meaning than the other.

What is claimed is:

1. A detector for measuring water organic compounds (WOCs) in an aqueous sample, comprising:
   a trap having a first cavity and purge extractor;
   said purge extractor defining a second cavity for receiving an extraction of WOCs from an aqueous sample, said purge extractor having spaced apart inlets and a first outlet and second outlet, one of said inlets configured to allow the passage of an aqueous sample to be analyzed into said second cavity and said other inlet configured to allow the passage of inert gas into said second cavity to purge WOCs from said second cavity;
   said inlets spaced apart to promote the uniform distribution of said inert gas and said aqueous sample;
   said first outlet and said second outlet configured to allow waste water to drain from said second cavity and to prevent water from entering said trap;

said trap comprised of a distribution network, said distribution network is comprised of a plurality of posts, said posts configured to have an affinity for a compound to be detected;

said posts having a metal oxide deposited thereon by atomic layer deposition to create a stationary phase medium;

said metal oxide is aluminum oxide, hafnium oxide or zirconium oxide; and said first cavity is coated with $SiO_2$ nanoparticles (SNPs).

2. The detector of claim 1 wherein when in a vertical position water is prevented from entering into said trap by locating said second outlet above said first outlet.

3. The detector of claim 1 wherein said metal oxide is aluminum oxide, hafnium oxide or zirconium oxide and is comprised of a plurality of layers.

4. The detector of claim 3 wherein said metal oxide is aluminum oxide, hafnium oxide or zirconium oxide and is comprised of a plurality of layers each of said layers is about 1-2 angstroms in thickness.

5. The detector of claim 4 wherein said posts are round, elongated or are in a zigzag pattern.

6. The detector of claim 5 wherein said posts are further coated with a Tenax TA poly (2,6-diphenylene oxide) film.

7. The detector of claim 1 wherein said first cavity is coated with $SiO_2$ nanoparticles (SNPs).

8. The detector of claim 1 wherein said trap is connected in series with a column, said column defining a third cavity in which a plurality of posts are located, said posts configured to have an affinity for a compound to be detected.

9. The detector of claim 8 further including a heater connected to said column.

10. The detector of claim 8 wherein said post of said column are coated with aluminum oxide, hafnium oxide or zirconium oxide.

11. A detector for measuring water organic compounds (WOCs) in an aqueous sample, comprising:
a purge extractor;
a trap defining a first cavity;
a thermal conductivity detector defining a second cavity;
a column defining a third cavity;
said purge extractor defining a fourth cavity for receiving an extraction of WOCs from an aqueous sample, said purge extractor having spaced apart inlets and a first outlet and second outlet, one of said inlets configured to allow the passage of an aqueous sample to be analyzed into said fourth cavity and said other inlet configured to allow the passage of inert gas into said fourth cavity to purge WOCs from said fourth cavity;
said inlets spaced apart to promote the uniform distribution of said inert gas and said aqueous sample;
said first outlet and said second outlet configured to allow waste water to drain from said fourth cavity and to prevent water from entering said trap;
said trap comprised of a distribution network;
said thermal conductivity detector includes a first resistor located at an inlet of said separation column and a second resistor located at an outlet of said separation column; and
said column in which a plurality of posts are located, said posts configured to have an affinity for a compound to be detected.

12. The detector of claim 11 wherein when in a vertical position water is prevented from entering into said trap by locating said second outlet above said first outlet.

13. The detector of claim 12 wherein said distribution network is comprised of a plurality of posts, said posts configured to have an affinity for a compound to be detected.

14. The detector of claim 13 wherein said posts having a metal oxide deposited thereon by atomic layer deposition to create a stationary phase medium on said metal oxide.

15. The detector of claim 14 wherein said metal oxide is aluminum oxide, hafnium oxide or zirconium oxide and is comprised of a plurality of layers.

16. The detector of claim 15 wherein said metal oxide is aluminum oxide, hafnium oxide or zirconium oxide and is comprised of a plurality of layers each of said layers is about 1-2 angstroms in thickness.

17. The detector of claim 16 wherein said posts of said column are coated with aluminum oxide, hafnium oxide or zirconium oxide.

* * * * *